(12) United States Patent
Slavin

(10) Patent No.: US 10,782,681 B1
(45) Date of Patent: Sep. 22, 2020

(54) PET SECURITY MONITORING

(71) Applicant: Alarm.com Incorporated, Tysons, VA (US)

(72) Inventor: Alison Jane Slavin, Falls Church, VA (US)

(73) Assignee: Alarm.com Incorporated, Tysons, VA (US)

( * ) Notice: Subject to any disclaimer, the term of this patent is extended or adjusted under 35 U.S.C. 154(b) by 159 days.

(21) Appl. No.: 15/796,512

(22) Filed: Oct. 27, 2017

Related U.S. Application Data

(63) Continuation of application No. 15/069,675, filed on Mar. 14, 2016, now Pat. No. 9,804,596.

(60) Provisional application No. 62/133,061, filed on Mar. 13, 2015.

(51) Int. Cl.
    *G05D 1/00* (2006.01)

(52) U.S. Cl.
    CPC .................. *G05D 1/0022* (2013.01)

(58) Field of Classification Search
    CPC .................................... G05D 1/0022
    See application file for complete search history.

(56) References Cited

U.S. PATENT DOCUMENTS

| 9,051,043 | B1 | 6/2015 | Peeters |
| 9,273,981 | B1 | 3/2016 | Downey |
| 9,280,559 | B1 | 3/2016 | Jones |
| 9,373,149 | B2 | 6/2016 | Abhyanker |
| 2004/0064225 | A1 | 4/2004 | Jammu |
| 2006/0011145 | A1* | 1/2006 | Kates ............... A01K 15/02 119/719 |
| 2006/0206246 | A1 | 9/2006 | Walker |
| 2012/0258731 | A1 | 10/2012 | Smith |
| 2014/0266669 | A1* | 9/2014 | Fadell ............ G05B 19/042 340/501 |
| 2016/0195602 | A1 | 7/2016 | Meadow |
| 2016/0357782 | A1 | 12/2016 | Jones |

* cited by examiner

*Primary Examiner* — Anne Marie Antonucci
(74) *Attorney, Agent, or Firm* — Fish & Richardson P.C.

(57) ABSTRACT

An electronic monitoring system is described that receives data indicating a location of a wireless beacon device that has been detected by a beacon monitoring device, and an identifier that is associated with the wireless beacon device, wherein the identifier corresponds to a mobile asset associated with a property. A location of the wireless beacon device is determined to be outside of an area that defines permissible locations of the mobile asset. Based on the determination, the electronic monitoring system determines to dispatch a robotic device to the location of the wireless beacon device. A particular robotic device to dispatch is identified based on the determination to dispatch a robotic device to the location of the wireless beacon device. A command is transmitted to the particular robotic device that instructs the particular robotic device to navigate to the location of the wireless beacon device.

19 Claims, 6 Drawing Sheets

500

```
┌─────────────────────────────────────┐
│ Receive data indicating a location  │
│ of a wireless beacon device and an  │
│ identifier that is associated with  │
│ the wireless beacon device          │
│                                 502 │
└─────────────────────────────────────┘
                  ↓
┌─────────────────────────────────────┐
│ Determine that the location of the  │
│ wireless beacon device is outside   │
│ of an area that defines permissible │
│ locations                       504 │
└─────────────────────────────────────┘
                  ↓
┌─────────────────────────────────────┐
│ Determine to dispatch a robotic     │
│ device to the location of the       │
│ wireless beacon device          506 │
└─────────────────────────────────────┘
                  ↓
┌─────────────────────────────────────┐
│ Identify a particular robotic       │
│ device to dispatch              508 │
└─────────────────────────────────────┘
                  ↓
┌─────────────────────────────────────┐
│ Transmit a command to the           │
│ particular robotic device that      │
│ instructs the particular robotic    │
│ device to navigate to the location  │
│ of the wireless beacon device   510 │
└─────────────────────────────────────┘
```

FIG. 5

PET SECURITY MONITORING

CROSS-REFERENCE TO RELATED APPLICATION

This application is a continuation (and claims the benefit of priority under 35 USC 120) of U.S. application Ser. No. 15/069,675, filed Mar. 14, 2016, now allowed, which claims the benefit of U.S. Provisional Application Ser. No. 62/133,061, filed Mar. 13, 2015, and titled "PET SECURITY MONITORING." Both of these prior applications are hereby incorporated by reference in their entirety.

TECHNICAL FIELD

This application relates generally to data communication between devices, and to location and activity monitoring.

BACKGROUND

A monitoring system for a property can include various components including sensors, cameras, and other devices that enable monitoring of the property. Additionally, a property may be equipped with one or more specially designed doors or fences for allowing a pet to move about the property without requiring monitoring by

SUMMARY

Techniques are described for assisting a user who is modifying a monitoring system to add or configure a component of the monitoring system.

Implementations of the described techniques may include hardware, a method or process implemented at least partially in hardware, or a computer-readable storage medium encoded with executable instructions that, when executed by a processor, perform operations.

The details of one or more implementations are set forth in the accompanying description below. Other features will be apparent from the description of the drawings.

BRIEF DESCRIPTION OF THE DRAWINGS

FIG. 5 depicts an example process.

DETAILED DESCRIPTION

Figure 1:
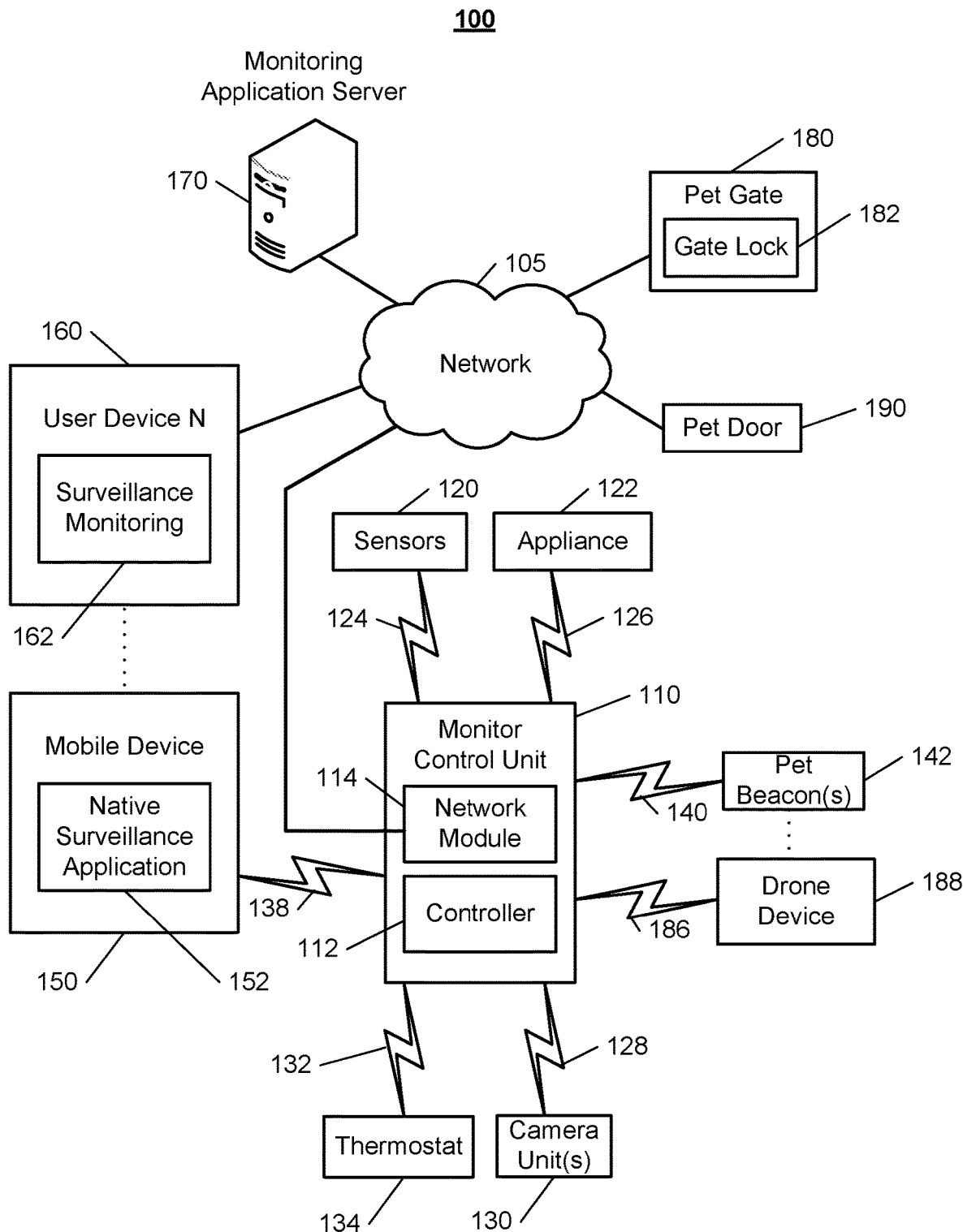
FIG. 1 illustrates an example of a system that assists with performing pet monitoring and controlling aspects of a property based on pet monitoring.

Techniques are described for monitoring systems for pet wellness and safety. In some implementations, transmitting beacon devices can be integrated into pet collars to track pet activity such as location, movement, and recent activity level. The beacon devices may be integrated with connected devices such as pet gates, pet doors, user devices, and a monitoring system control unit to track pet activity, specify the location of lost pets, and enable an automated pet care system. The information gathered by the monitoring system may also be transmitted over a network to allow pet owners to track pet activity and control the connected devices remotely.

In some implementations, a system includes a dog door with connectivity (e.g., wired or wireless) connected to a local area network (e.g., wifi, Bluetooth, etc.), and indirectly (through the LAN) or directly to other devices like a sensor/beacon on the dog collar, video cameras, image sensors, locks and sensors on gates, motion sensors, security system, drones, etc. A sensor/beacon/transmitter device may be attached to or integrated into the dog collar. The device identifies the dog, can track the location of the dog and the dog's distance from the house, (e.g., GPS and/or beacon), and can provide other data about the state of the dog, recent activity level of the dog (e.g., not active, slept last 5 hours), how long it's been since dog last went outside (this data point can also be monitored by the door itself), how long it's been since last went to the bathroom (e.g., accelerometer, gyroscope and other sensors in device can detect a "doggy squat" and "leg up" positions that signal these events). The device can be put in learning mode to learn that dog's unique style but come preloaded with enough data to make an educated guess, based on the dog's size, age and gender.

In addition, a connected gate with sensors can detect whether the gate is currently open or closed. A connected lock on the gate can automatically lock the gate based on the status of other devices. Outdoor video cameras can record video footage when the dog is outside and indoor video cameras can record video footage when the dog is inside. In addition, the system may integrate with a local weather data feed, and/or local weather related sensors (e.g., rain sensor, humidity sensor, outdoor temperature, light, wind, etc.). An integrated sound maker/whistle and dog feeder/treat dispenser to beckon the dog back into the house may be part of the system. Also, one or more connected drones with video/audio/annunciation/flying capabilities may be used.

In some examples, the system allows your house to automatically let your dog out into your fenced yard when he/she needs to go to the bathroom, needs exercise, or needs a break from the boredom of being inside. The system makes sure that the dog is wearing its ID collar before it goes outside. The system will not let the dog out if the weather is not good, if the gate is open, if the gate has recently been opened and the video cameras and/or motion detectors detect an ongoing presence in the backyard (e.g., landscapers cutting the grass; a nosy neighbor; an intruder). Rules can be set to prevent the dog from going outside based on a schedule, the arming state of the security system, the location of the dog's owners (e.g., if they are on their way home from work, it will wait for them to get home rather than let the dog out; if dog has not been out for five hours and neither owner/parent has left work yet, it will let the dog out.) The system may beckon the dog back into the house by emitting a sound (e.g., whistle, beep, recorded clip of its owner's voice calling him) and once back through the dog door and inside the house, the automated treat dispenser would dispense treats. If the system detects someone approaching the gate (through video and motion sensors) and preparing to enter the fenced yard, while the dog is outside in the yard, it can lock the gates (if there are connected locks) or it can beckon the dog inside for a treat and keep the dog in until the yard is secure again. Video and images can be automatically recorded based on triggers from the collar, the dog door, the motion sensors and the camera's image analysis itself. The recordings can be local on a recording device, or in the cloud. These examples may be used for a cat or other domesticated animal.

In a multiple pet (e.g., dog) system, the dog door would only allow the passage of the dog(s) with their approved ID/tracking collars, and only if the rules that are specific to those dogs are satisfied. For example, if one dog has a tendency to urinate in the house after four hours, the system may have a rule that allows it outside more often. Some dogs may require more exercise and will therefore be allowed outside more often. The rules governing the permissions for dogs to be let out would be dog-specific and could depend on any of the variables described above.

If the gate is left open or the dog otherwise gets outside the fenced in area, the owners and other notification recipients would be alerted immediately. Video would be recorded. A drone (owned by the pet's family, shared by the neighborhood, other) could be dispatched to hover above the dog, follow it, stream video of it so its owners can find it more quickly. If someone stopped to help the dog, the drone would capture imagery of who they were, and could provide a two way voice/video call connection to the dog's owners or other care providers, to immediately put the person in touch with the owners and expedite the dog's safe return home. The drone can also talk to the person who found the dog, explaining that the purpose of the drone is to make sure the dog does not get lost, and provide the dog-finder the address where he/she should return the dog. The drone can also ask the dog-finder to follow the drone back to the dog's home, and bring the dog with him/her, so it could be returned to the fenced yard. The drone would be connected to the system, and would enable the gate to be unlocked (if locked) to let the dog-finder open the gate and let the dog back in the yard until the owner returns home. From the yard, the system would be able to beckon the dog back into the house. The drone would receive confirmation of the dog's safe return (e.g., dog collar beacon/GPS device confirms, plus drone has visual confirmation) and return to the docking station to charge and wait for the next emergency.

The system may detect if dog bathroom habits change, and alert the owners. The system may track frequency of urination and/or defecation and analyze for changes in bathroom behavior over time. Any changes may be reported to flag potential health issues for the dog.

If the security system at the house reports a fire, carbon monoxide or other life-threatening alarm, the system could beckon the dog(s)/pet(s) to exit the house through the doggy door so they can be safely outside if the house is on fire or there is a gas leak. These actions may be governed by rules similar those described throughout—location of owners, time of day, conditions outside, whether the gate is closed, duration of alarm, etc.

In some examples, systems may have multiple, contiguous fenced yards of neighbors integrated via connected gates that allow dogs access across multiple neighboring fenced yards. The rules above would apply, along with rules that govern whether the dog should be allowed to enter a neighbor's yard. If dog is allowed, gate could be automatically unlocked or opened when dog approaches (if not already open). If an interconnected gate is open, and the dog is not allowed into the neighboring yard connected through the open gate based on rules, the dog would not be allowed into the yard. In some cases, the system could automatically close the gate that connects the dogs own yard with the neighboring yard. The system could also alert a nearby human to close the gate, so that the dog(s) could safely go outside without straying into a neighboring property.

With interconnected yards and gates, multiple dogs originating at multiple properties could be allowed outside at the same time to play with each other in the multiple connected yards. Or, conversely, if the dogs do not get along, the system would make sure that the dogs are not outside in the same fenced area at the same time. The system could close the interconnected gates, or just wait for a first dog to return inside before a second dog goes outside. This could scale to many yards and many dogs.

In the multiple dogs playing/sharing yards scenario, a flying drone with video may hover to provide aerial footage to owners of the dog play, or may do periodic flybys to check on things, and record the footage for owners to view later. The owners or other care providers could be alerted if the dog has not spent enough time outside (e.g., the dog has not attempted to exit via dog door) or if the dog has spent too much outside and is not coming in, even when beckoned.

In some implementations, the owners of the dog, when remote, may view, in a heads up display (HUD), a projected hologram/3d portrayal, or more traditional flat screen UI (phone, laptop, TV screen etc.) the live and recorded footage of the dog whether inside the home, outside in the yard, or being tracked when off the property by a drone. For instance, a drone could capture 3D images and a remote owner could view those images as a holographic projection.

If the dog has strayed far from home, too far for the dog-finder (e.g., the person who found the dog) to walk them back as in the earlier example, the system could automatically beckon a shared driving service (e.g., an Uber-like network of pet assistors) to bring the dog-finder and dog home, and then return the dog-finder to their original location. The system would automatically charge the dog owner's account. Rules may govern how far away they would be willing to pay for a round trip, and the owner may weigh in/decide/approve the trip in real time once connected.

In addition, biometric data on the dog may be transmitted through sensors/transmitters attached to the collar to ensure its well-being when it's inside/outside at home and if/when it has escaped (e.g., heart rate, outdoor temperature (to make sure dog is not overheating somewhere), etc.). The dog collar (or attached sensors) may have a microphone and/or speaker and/or video camera recording capability and cellular or other WAN transmission capabilities, which could provide communication with a hovering drone.

In some implementations, the system may use network density and crowd effects to alert other dog owners (and other good Samaritans) in the area of the lost dog, to get their help finding the dog. Live and recorded streams of the dog's location, status, video (e.g., from a drone or from a dog's collar) may be shared with these other trusted people to have them help find the dog if the owner is not nearby yet. The system may coordinate a neighborhood effort looking for the dog, and may keep all the participants connected (via apps, HUDs, holos, etc) until the dog is found.

A lost dog's sensor/collar may detect that dog is moving in a car. For instance, the sensor/collar may determine that its current speed is greater than dog ground speed and detect the stop/start of car motion. The sensor/collar than may determine that the dog has not been identified as "found" by a Good Samaritan in the system. In this case, the drone and/or dog collar camera may capture the license plate of a car that has the dog inside and issue a dog version of an amber alert on the system. The dog collar also may continue to transmit location if it's still being worn.

If a person tried to steal the dog, and attempts to remove the collar, the collar may automatically transmit a duress signal when unlatched or severed, and include last known location and the fact that it's no longer being worn by the dog. The dog collar may have an arm/disarm lock/unlock mechanism, so only authorized users can remove the collar from the dog (with a fingerprint, user code, voice recognition phrase, or other authentication). The power requirements for all the electronics on the dog's collar (e.g., sensors, beacons, GPS, transmitter for cell/wi-fi, etc.) may prevent all electronics from being embedded in the dog like passive microchips. However, in some instances, a subset of the components may be embedded in the dog, so that the dog can still be safe even if the collar is removed. Specifically, a low energy Bluetooth beacon could be embedded in the dog. This beacon may only be activated when the collar is removed, or may be always active. Whenever the dog comes within range of a device that detected its beacon, its location would be known and transmitted to the system. The devices that detect the dog's beacon may include mobile phones (e.g., "good Samaritan" system users would have an app running in the background, and automatically transmit data when they lock in with a lost dog beacon), local area wifi networks (e.g., a lost dog walks by a business and its router detects the dog's beacon), and embedded beacon detectors (e.g., devices with wired/wireless long range internet connectivity and short range beacon detection) at "doggy stations" that exist to attract lost dogs with water, shelter, etc. Once any of these devices detects the lost dog's beacon, the dog's location would be provided to the owners/care providers. In the network effect/user density scenario, nearby users would be alerted so they could find and shelter the dog until owners can come for it. A local drone could also be dispatched at this point, once the dog has been located, to keep an eye on it until someone comes to its rescue. The doggy station may also be outfitted with camera(s) to keep an eye on the dogs that show up there.

The doggy stations may be a managed part of the system (e.g., a system provided and maintained by the same company that provides the security monitoring) or may be a standalone product that any person could buy and install on their property to help find/locate lost dogs or other pets who have embedded beacons, improving the network density of the beaconing system and its ability to find lost dogs.

An addition to the dog door system at the home, weight/size/mass sensors (e.g., a scale, a camera that can scan for size/shape, a radar type device that works like dolphin echolocation and can detect the size/shape/distance of what is in front of it) can be used to detect the size/shape/mass of the animal attempting to enter/exit through the dog door, to make sure that the animal attempting to enter/exit through the dog door is indeed the animal with permission. This serves as a redundant form of authentication to the ID on the dog collar, or may work if the collar falls off, or if a second animal is trying to enter with the dog that is rightfully allowed to enter. For example, a dog wearing his ID collar is waiting at the dog door so he may exit the house into the yard, but the system detects that a cat is right behind or under him. In this example, the cat is not authorized to exit so the doggy door will not open with the cat there. In this example, the system may sound a loud noise to scare the cat away and then use its treat beckoning system to bring the dog back.

FIG. 1 illustrates an example of an electronic system 100 configured to provide pet surveillance and reporting. The electronic system 100 includes a network 105, a monitoring system control unit 110, one or more user devices 150, 160, a monitoring application server 170, a pet gate 180, and a pet door 190. In some examples, the network 105 facilitates communications between the monitoring system control unit 110, the one or more user devices 150, 160, the monitoring application server 170, the pet gate 180, and the pet door 190.

The network 105 is configured to enable exchange of electronic communications between devices connected to the network 105. For example, the network 105 may be configured to enable exchange of electronic communications between the monitoring system control unit 110, the one or more user devices 150, 160, and the monitoring application server 170. The network 105 may include, for example, one or more of the Internet, Wide Area Networks (WANs), Local Area Networks (LANs), analog or digital wired and wireless telephone networks (e.g., a public switched telephone network (PSTN), Integrated Services Digital Network (ISDN), a cellular network, and Digital Subscriber Line (DSL)), radio, television, cable, satellite, or any other delivery or tunneling mechanism for carrying data. Network 105 may include multiple networks or subnetworks, each of which may include, for example, a wired or wireless data pathway. The network 105 may include a circuit-switched network, a packet-switched data network, or any other network able to carry electronic communications (e.g., data or voice communications). For example, the network 105 may include networks based on the Internet protocol (IP), asynchronous transfer mode (ATM), the PSTN, packet-switched networks based on IP, X.25, or Frame Relay, or other comparable technologies and may support voice using, for example, VoIP, or other comparable protocols used for voice communications. The network 105 may include one or more networks that include wireless data channels and wireless voice channels. The network 105 may be a wireless network, a broadband network, or a combination of networks including a wireless network and a broadband network.

The monitoring system control unit 110 includes a controller 112 and a network module 114. The controller 112 is configured to control a monitoring system (e.g., a home alarm or security system) that includes the monitoring system control unit 110. In some examples, the controller 112 may include a processor or other control circuitry configured to execute instructions of a program that controls operation of an alarm system. In these examples, the controller 112 may be configured to receive input from sensors, detectors, or other devices included in the alarm system and control operations of devices included in the alarm system or other household devices (e.g., a thermostat, an appliance, lights, etc.). For example, the controller 112 may be configured to control operation of the network module 114 included in the monitoring system control unit 110.

The network module 114 is a communication device configured to exchange communications over the network 105. The network module 114 may be a wireless communication module configured to exchange wireless communications over the network 105. For example, the network module 114 may be a wireless communication device configured to exchange communications over a wireless data channel and a wireless voice channel. In this example, the network module 114 may transmit alarm data over a wireless data channel and establish a two-way voice communication session over a wireless voice channel. The wireless communication device may include one or more of a LTE module, a GSM module, a radio modem, cellular transmission module, or any type of module configured to exchange communications in one of the following formats: LTE, GSM or GPRS, CDMA, EDGE or EGPRS, EV-DO or EVDO, UMTS, or IP.

The network module 114 also may be a wired communication module configured to exchange communications over the network 105 using a wired connection. For instance, the network module 114 may be a modem, a network interface card, or another type of network interface device. The network module 114 may be an Ethernet network card configured to enable the monitoring system control unit 110 to communicate over a local area network and/or the Internet. The network module 114 also may be a voiceband modem configured to enable the alarm panel to communicate over the telephone lines of Plain Old Telephone Systems (POTS).

The monitoring system that includes the monitoring system control unit 110 includes one or more sensors or detectors. For example, the monitoring system may include multiple sensors 120. The sensors 120 may include a contact sensor, a motion sensor, a glass break sensor, or any other type of sensor included in an alarm system or security system. The sensors 120 also may include an environmental sensor, such as a temperature sensor, a water sensor, a rain sensor, a wind sensor, a light sensor, a smoke detector, a carbon monoxide detector, an air quality sensor, etc. The sensors 120 further may include a health monitoring sensor, such as a prescription bottle sensor that monitors taking of prescriptions, a blood pressure sensor, a blood sugar sensor, a bed mat configured to sense presence of liquid (e.g., bodily fluids) on the bed mat, etc. In some examples, the sensors 120 may include a radio-frequency identification (RFID) sensor that identifies a particular article that includes a pre-assigned RFID tag.

The monitoring system control unit 110 communicates with the module 122 and the camera 130 to perform surveillance or monitoring. The module 122 is connected to one or more devices that enable home automation control. For instance, the module 122 may be connected to one or more lighting systems and may be configured to control operation of the one or more lighting systems. Also, the module 122 may be connected to one or more electronic locks at the property and may be configured to control operation of the one or more electronic locks (e.g., control Z-Wave locks using wireless communications in the Z-Wave protocol. Further, the module 122 may be connected to one or more appliances at the property and may be configured to control operation of the one or more appliances. The module 122 may include multiple modules that are each specific to the type of device being controlled in an automated manner. The module 122 may control the one or more devices based on commands received from the monitoring system control unit 110. For instance, the module 122 may cause a lighting system to illuminate an area to provide a better image of the area when captured by a camera 130.

The camera 130 may be a video/photographic camera or other type of optical sensing device configured to capture images. For instance, the camera 130 may be configured to capture images of an area within a building monitored by the monitoring system control unit 110. The camera 130 may be configured to capture single, static images of the area and also video images of the area in which multiple images of the area are captured at a relatively high frequency (e.g., thirty images per second). The camera 130 may be controlled based on commands received from the monitoring system control unit 110.

The camera 130 may be triggered by several different types of techniques. For instance, a Passive Infra Red (PIR) motion sensor may be built into the camera 130 and used to trigger the camera 130 to capture one or more images when motion is detected. The camera 130 also may include a microwave motion sensor built into the camera and used to trigger the camera 130 to capture one or more images when motion is detected. The camera 130 may have a "normally open" or "normally closed" digital input that can trigger capture of one or more images when external sensors (e.g., the sensors 120, PIR, door/window, etc.) detect motion or other events. In some implementations, the camera 130 receives a command to capture an image when external devices detect motion or another potential alarm event. The camera 130 may receive the command from the controller 112 or directly from one of the sensors 120.

In some examples, the camera 130 triggers integrated or external illuminators (e.g., Infra Red, Z-wave controlled "white" lights, lights controlled by the module 122, etc.) to improve image quality when the scene is dark. An integrated or separate light sensor may be used to determine if illumination is desired and may result in increased image quality.

The camera 130 may be programmed with any combination of time/day schedules, system "pet monitoring state", or other variables to determine whether images should be captured or not when triggers occur. The camera 130 may enter a low-power mode when not capturing images. In this case, the camera 130 may wake periodically to check for inbound messages from the controller 112. The camera 130 may be powered by internal, replaceable batteries if located remotely from the monitoring control unit 110. The camera 130 may employ a small solar cell to recharge the battery when light is available. Alternatively, the camera 130 may be powered by the controller's 112 power supply if the camera 130 is co-located with the controller 112.

In some implementations, the camera 130 communicates directly with the monitoring application server 170 over the Internet. In these implementations, image data captured by the camera 130 does not pass through the monitoring system control unit 110 and the camera 130 receives commands related to operation from the monitoring application server 170.

The system 100 also includes thermostat 134 to perform dynamic environmental control at the property. The thermostat 134 is configured to monitor temperature and is further configured to provide control of environmental (e.g., temperature) settings. In some implementations, the thermostat 134 can additionally or alternatively receive data relating to activity at a property and/or environmental data at a property, e.g., at various locations indoors and outdoors at the property.

In some implementations, the thermostat 134 is a dynamically programmable thermostat and can be integrated with the monitoring system control unit 110. For example, the dynamically programmable thermostat 134 can include the monitoring system control unit 110, e.g., as an internal component to the dynamically programmable thermostat 134. In addition, the monitoring system control unit 110 can be a gateway device that communicates with the dynamically programmable thermostat 134.

The system 100 also includes a pet beacon 142 that may be attached or integrated into a pet collar. The pet beacon 142 identifies the pet, tracks the location of the pet, and monitors activity level of the pet (e.g., heart rate, daily steps, calories burned, etc.) using embedded sensors within the pet beacon 142 such as accelerometers, gyroscopes, heart rate sensors, or other sensors that detect movement and track such data over certain time periods. In some implementations, the pet beacon 142 may include a machine learning module to initially detect patterns in the pet's daily activities and perform regressions against standardized data to develop pet-specific tracking (e.g., time-activated tracking based on heart rate elevation, activity tracking based on increased motion movements).

The pet beacon 142 includes sensors and control processors that allow it to generate and aggregate data around pet activity. For instance, the pet beacon 142 may use one or more proximity sensors, one or more gyroscopes, one or more accelerometers, one or more magnetometers, a global positioning system (GPS) unit, an altimeter, one or more sonar or laser sensors, and/or any other types of sensors that aid in detecting pet activity. In some instances, the pet beacon 142 may include a short-range or long-range wireless communication device, such that communications of the pet beacon 142 using the short-range or long-range wireless communication device can be used to locate the pet beacon 142. For example, the pet beacon 142 may include a device that uses Bluetooth, Bluetooth Low Energy (BLE, also known as Bluetooth Smart), Zwave, Zigbee, Wi-Fi, near-field communication (NFC), radio frequency identification etc., for determining the location of the pet beacon 142. The pet beacon 142 may also include such devices to allow the drone device 188 to communicate with other devices in the property.

In some implementations, pet collars with embedded pet beacons 142 may include a microphone, a speaker, a video camera, or a combination of either, and recording capability to transmit video or image feeds over the network 105. In such implementations, the pet collars may have broadband or WAN transmission capabilities to exchange communications with the sensors 120, the module 122, the camera 130, the thermostat 134, the connected pet gate 180, the pet door 190, the pet beacon 142, and the drone device 188.

In some examples, the pet collars with embedded pet beacons may also have arming/disarming and locking/unlocking mechanisms to only allow authorized users to remove the collars from the pet. In such examples, the pet collars may accept some form of user input to perform an authentication (e.g., fingerprint, user-submitted code, voice recognition code, etc.). In addition, the pet collar may also provide a unique identifier for the pet, either locally through a Wifi network or remotely over the network 105 to enable surveillance and reporting capabilities of pet activity. In such examples, the unique identifier may be used as a tracking and signaling mechanism to provide alerts or notifications to users on the one or more mobile devices 150, 160 or certain identified threats (e.g., pet robbery). For instance, the pet collars with embedded pet beacon 142 may be used to transmit distress signals to the drone device 188 to provide surveillance when the pet may be in danger. In addition, the pet beacon 142 may submit distress signals to other devices connected over the network 105.

In some implementations, the pet beacon 142 may be embedded within the pet and may be activated only when a pet collar with another beacon 142 is removed from the pet. In such implementations, when the pet with the embedded pet beacon 142 is within the range of a device that is activated by the pet beacon 142 (e.g., the pet gate 180, the monitoring control unit 110, the one or more user devices 150, 160), the pet beacon 142 may transmit pet activity data to another nearby device. For example, the one or more user devices 150, 160 may receive a notification if the pet beacon 142 is activated based on its proximity to a related device. For instance, if a pet owner has lost his dog, then the pet beacon 142 may be activated when it comes within close proximity with a beacon-activating device, which may subsequently transmit the location of the pet beacon 142 to the one or more user devices 150, 160 so that the pet owner may locate the lost pet. In such instances, the beacon-activating devices may include pet stations with beacon detectors that receive signal transmissions from the monitoring application server 170 to track pet activity data generated by the system 100.

In some implementations, the pet stations with beacon-activating devices may be monitored as part of the system 100. For example, the monitoring application server 170 may connect to a central station that aggregates data collected from all pet stations within a neighborhood where multiple monitoring stations may exist. In such examples, the monitoring application server 170 receives data transmissions from the central station indicating when nearby pet stations have been activated by one or more pet beacons 142. The monitoring application server 170 may subsequently transmit such data to the monitoring system control unit 110 if it detects that a connected pet beacon 142 of a specified property has recently activated a pet station. In such examples, the pet stations are connected over the network 105 to transmit the data of the beacon-activating devices to multiple monitoring application servers 170, which may monitor multiple monitoring system control units 110 of various properties within a specific location (e.g., one mile radius).

The system 100 further includes a pet gate 180 with a gate lock 182. The pet gate 180 may be any fence with an entrance and an enclosing structure within a property that limits movements outside the boundaries of the structure. For example, the connected pet gate 180 may be a fenced structure within the backyard of the property used to prevent a pet from leaving the enclosed region. In this example, the pet gate 180 may have sensors that detect whether the gate entrance is open or closed, and that detect the pet near the pet gate 180 in the enclosed region using the pet beacon 142.

The pet gate 180 also includes a connected lock 182 that automatically locks the gate based on the status of devices connected to the monitoring system control unit. For example, connected lock 182 may determine when to open and close the pet gate 180 based on the activity data generated from the pet beacon 142. For instance, the pet gate 180 may determine, from training data such as sleep and walking patterns tracked by the pet beacon 142, when to automatically open the pet gate 180 to allow the pet to get additional exercise in a larger enclosed region to which the pet gate 180 provides access. In another instance, the connected pet lock 182 may use weather pattern data from the thermostat 134 to determine if the weather may be dangerous to allow the pet to exit the pet gate 180. In another instance, the connected pet lock 182 may receive motion data from the one or more camera units 130 to determine if it there is an ongoing presence within the property that makes opening the connected gate 180 to protect the pet's safety. For example, if a property where the pet gate 180 is located is receiving construction or landscaping services in a nearby location such as the backyard or the second floor, the connected gate may utilize movements detected within the camera units 130 to determine that the connected lock 182 should be unlocked to allow the pet to leaving a threatening situation.

In some implementations, a pet owner may design a rule-based system within the monitoring system 110 that allows the gate lock 182 to open under specific circumstances specified by the pet owner. For example, the pet owner may set certain time periods when the lock may be open in order to control access through the pet gate 180, or set time thresholds for opening and closing the gate lock 182 to control the frequency and duration of entrance and exit through the pet gate 180. In another instance, the pet beacon may provide a notification signal to the monitoring system control unit 110, which may transmit a subsequent notification to the pet owner to bring the pet back within the property.

In some implementations, the pet gate 180 and may function with one or more pet beacons 142. In such implementations, the multiple pet beacons 142 may have specific identifiers that allow the monitoring system control unit 110 to associate the data from individual pet beacons 142 with data generated from individual pets. For instance, the pet gate 180 and gate lock 182 may have different rule-based activations for the different pet beacons 142 based on the behaviors of individual pets. In such instances, the gate lock 182 may perform a verification process to ensure that it only opens the pet gate 180 for the specified pet beacon 142 based on matching the unique identifier of the pet beacon to a transmission it receives from the monitoring system control unit.

The system 100 also includes a pet door 190. The pet door 190 is a door connected directly or indirectly to other devices (e.g., the monitoring system control unit 110, the pet gate 180) over the network 105. The pet door 190 further exchanges communications with the sensors 120, the module 122, the camera 130, the thermostat 134, and the pet beacon 142 to monitoring activity (e.g., pet activity) and allow the pet to leave or enter the property. For example, the pet door 190 may be a doggy door that automatically locks and unlocks to allow the pet to enter and leave a house. In such examples, the pet door 190 may be controlled by the monitoring system control unit 110 to determine if specific conditions (e.g., weather conditions, time of day) are satisfied to allow the pet to exit the house.

In some implementations, the pet door 190 and the pet gate 180 are simultaneously monitored by the monitoring system control unit 110 to control pet activity within the property where the monitoring system control unit 110 is located. For example, the monitoring system control unit may enable the pet door 190 to allow the pet to exit the house and enter the yard but disable the gate lock 182 on the pet gate 180 to prevent the pet from leaving the yard. In another instance, the pet door 190 and the pet gate 180 may be used in conjunction with the one or more cameras 130 or sensors 120 to prevent the pet from leaving the yard in response to local activity within the property. For example, if the sensors 120 detect motion outside the pet gate 180, it may transmit a signal to the monitoring system control unit 110 to disable the gate lock 182 to prevent the pet from exiting the enclosed area of the yard. In such examples, the pet door 190 may still be activated, allowing the pet to enter and exit the property within the enclosed area of the yard.

In some implementations, the pet door 190 may have weight, mass or size sensors (e.g., a scale, a scanning camera, radar device) that scans a nearby pet to determine its shape, size and distance from the pet door 190. In such implementations, the pet door 190 may use such data as a verification technique to allow specific pets to enter and exit the property. For example, in properties where there are multiple pets, the pet door 190 may create a unique identifier for each pet using the weight, mass or size data to design specific rules for each individual pet within the property. In such examples, the pet door 190 may initially authenticate the pet beacon 142 on the pet prior to allowing the pet to enter or exit through the pet door 190. Also, the pet door may utilize a proximity-based activation to prevent unauthorized pets from entering or exiting through the pet door 190. For example, if the pet door 190 detects two pets nearby the pet door 190, one of which is unauthorized, the pet door 190 may remain inactivated until the unauthorized pet is a sufficient distance away from the pet door 190. In another example, if a pet leaves the property and attempts to return with an unauthorized companion through the pet door 190, the pet door 190 may restrict entry into the property for the unauthorized companion to prevent a wild animal from entering the property. In addition, the pet door 190 may have specified rules for authorized pets (e.g., neighbor's pets) that allow authorized pets in addition to the pet owner's pets to enter the property.

The system 100 also includes a drone device 188. The drone device 188 may be any type of unmanned aerial device that is capable of collecting and transmitting video feeds using attached cameras. For example, the drone device 188 may be capable of moving throughout a property based on automated control technology and/or user input control provided by the user. In this example, the drones may be able to fly, roll, walk, or otherwise move about the property. The drone device 188 may include helicopter type devices (e.g., quad copters), rolling helicopter type devices (e.g., roller copter devices that can fly and also roll along the grounds, walls, or ceiling) and land vehicle type devices (e.g., automated cars that drive around a property).

In some implementations, the drone device 188 may be dispatched in response to a pet leaving the premises of the property without a user's control. In such implementations, the drone device 188 may track the movement of the pet by communicating location information from the pet beacon 142. For instance, the drone device 188 may exchange standard wireless communication protocols independent of the property's internet connection (e.g., infrared, near-field communication) to track pet movements. In such implementations, the drone device 188 may collect a video feed surrounding the pet movements to enable the pet owners to find and retrieve the pet in a timely manner. In some instances, the drone device 188 may be equipped with a broadband connection that allows it to contact a user directly to provide a notification of where the pet may be located. Specific examples may include transmitting an automated text-based message via SMS or email, initiating a two-way video broadcast video feed or call connection, and/or transmitting its GPS location on a map interface to allow the pet owner to determine the real-time location of the pet.

In some examples, the drone device 188 may include data capture and recording devices. In these examples, the drone device 188 may include one or more cameras, one or more motion sensors, one or more microphones, one or more biometric data collection tools, one or more temperature sensors, one or more humidity sensors, one or more air flow sensors, and/or any other types of sensors that may be useful in capturing monitoring data related to pet activity in the property.

In some implementations, the drone device 188 may also include output devices. In these implementations, the drone drive 188 may include one or more displays, one or more speakers, one or more projectors, and/or any type of output devices that allow the drone device 188 to communicate information to a nearby pet owner. The one or more projectors may include projectors that project a two-dimensional image onto a surface (e.g., wall, floor, or ceiling) and/or holographic projectors that project three-dimensional holograms into a nearby space.

The drone device 188 also may include a communication module that enables the drone device 188 to communicate with the monitoring system control unit 110, the pet beacon 142, and/or other devices. The communication module may be a wireless communication module that allows the drone device 188 to communicate wirelessly. For instance, the communication module may be a Wi-Fi module that enables the drone device 188 to communicate over a local wireless network at the property. The communication module further may be a 900 MHz wireless communication module that enables the drone device 188 to communicate directly with the monitoring system control unit 110. Other types of short-range wireless communication protocols, such as Bluetooth, Bluetooth LE, Zwave, Zigbee, etc., may be used to allow the drone device 188 to communicate with other devices in the property.

The drone device 188 further may include processor and storage capabilities. The drone device 188 may include any suitable processing devices that enable the drone device 188 to operate applications and perform the actions described throughout this disclosure. In addition, the drone device 188 may include solid state electronic storage that enables the drone device 188 to store applications, configuration data, collected sensor data, and/or any other type of information available to the drone device 188.

The sensors 120, the module 122, the camera 130, the thermostat 134, the pet beacon 142, and the drone device 188 communicate with the controller 112 over communication links 124, 126, 128, 132, 140 and 186, respectively. The communication links 124, 126, 128, 132, 140, and 186 may be a wired or wireless data pathway configured to transmit signals from the sensors 120, the module 122, the camera 130, the thermostat 134, the pet beacon 142 and the drone device 188 to the controller 112. The sensors 120, the module 122, the camera 130, the thermostat 134, the pet beacon 142, and the drone device 188 may continuously transmit sensed values to the controller 112, periodically transmit sensed values to the controller 112, or transmit sensed values to the controller 112 in response to a change in a sensed value.

The communication links 124, 126, 128, 132, 140, and 186 may include a local network. The sensors 120, the module 122, the camera 130, the thermostat 134, the pet beacon 142, the drone device 188 and the controller 112 may exchange data and commands over the local network. The local network may include 802.11 "WiFi" wireless Ethernet (e.g., using low-power WiFi chipsets), Z-Wave, Zigbee, Bluetooth, "Homeplug" or other "Powerline" networks that operate over AC wiring, and a Category 5 (CAT5) or Category 6 (CAT6) wired Ethernet network. The local network may be a mesh network constructed based on the devices connected to the mesh network.

The monitoring application server 170 is an electronic device configured to provide monitoring services by exchanging electronic communications with the monitoring system control unit 110, and the one or more user devices 150, 160, the pet gate 180, and the pet door 190 over the network 105. For example, the monitoring application server 170 may be configured to monitor events (e.g., alarm activity, pet activity, appliance activity) generated by the monitoring system control unit 110. In this example, the monitoring application server 170 may exchange electronic communications with the network module 114 included in the monitoring system control unit 110 to receive information regarding events (e.g., pet activity) detected by the monitoring system control unit 110. The monitoring application server 170 also may receive information regarding events (e.g., gate opening activity) from the pet gate 180.

In some examples, the monitoring application server 170 may receive security system data from the monitoring system control unit 110 indicating a life-threatening event within the event such as a fire alarm event, carbon monoxide detection, or a security breach. In such examples, the monitoring application server 170 may send a set of computer-implemented protocols to the monitoring system control unit 110 to enable settings that protect the safety of a pet within the property. For example, the monitoring application server 170 may send a notification to pet owners or nearby neighbors using the one or more user devices 150, 160 in response to receiving a transmission from the monitoring system control unit 110 that there was a fire alarm detected by one of the appliances within the property. In such examples, the pet owner is notified of the location of the pet using the pet beacon 142 and the fire alarm event triggered by the monitoring system control unit 110.

The monitoring application server 170 may store sensor and image data received from the monitoring system and perform analysis of sensor and image data received from the monitoring system. Based on the analysis, the monitoring application server 170 may communicate with and control aspects of the monitoring system control unit 110 or the one or more user devices 150, 160. For example, if the monitoring application server 170 determines from the sensor data from the pet beacon 142 that the pet may be dangerously close to a certain appliance within the property, the monitoring application server 170 may use the sensor data to provide a signal to the monitoring system control unit 110 to disable the appliance to prevent harm to the pet. For example, if a pet is nearby an electronic hazard, the monitoring application server 170 may determine, based on the proximity of the pet beacon 142 to the detected hazard, that there may be a danger to the pet and consequently disable the appliance creating the hazard through the monitoring system control unit 110.

The user device 150 includes a native surveillance application 152. The native surveillance application 152 refers to a software/firmware program running on the corresponding mobile device that enables the user interface and features described throughout. The user device 150 may load or install the native surveillance application 152 based on data received over a network or data received from local media. The native surveillance application 152 runs on mobile devices platforms, such as iPhone, iPod touch, Blackberry, Google Android, Windows Mobile, etc. The native surveillance application 152 enables the user device 12 to receive and process image and sensor data from the monitoring system regarding pet activity.

The user device 160 may be a general-purpose computer (e.g., a desktop personal computer, a workstation, or a laptop computer) that is configured to communicate with the monitoring application server 170 and/or the monitoring system control unit 110 over the network 105. The user device 160 may be configured to display a surveillance monitoring user interface 162 that is generated by the user device 150 or generated by the monitoring application server 170. For example, the user device 160 may be configured to display a user interface (e.g., a web page) provided by the monitoring application server 170 that enables a user to perceive images captured by the camera 130 and/or reports related to the monitoring system. Although FIG. 1 illustrates two user devices for brevity, actual implementations may include more (and, perhaps, many more) or fewer user devices.

In some implementations, the one or more user devices 150, 160 communicate with and receive monitoring system data from the monitoring system control unit 110 using the communication link 138. For instance, the one or more user devices 150, 160 may communicate with the monitoring system control unit 110 using various local wireless protocols such as wifi, Bluetooth, zwave, zigbee, HomePlug (ethernet over powerline), or wired protocols such as Ethernet and USB, to connect the one or more user devices 150, 160 to local security and automation equipment. The one or more user devices 150, 160 may connect locally to the monitoring system and its sensors and other devices. The local connection may improve the speed of status and control communications because communicating through the network 105 with a remote server (e.g., the monitoring application server 170) may be significantly slower.

Although the one or more user devices 150, 160 are shown as communicating with the monitoring system control unit 110, the one or more user devices 150, 160 may communicate directly with the sensors and other devices controlled by the monitoring system control unit 110. In some implementations, the one or more user devices 150, 160 replace the monitoring system control unit 110 and perform the functions of the monitoring system control unit 110 for local monitoring and long range/offsite communication.

In other implementations, the one or more user devices 150, 160 receive monitoring system data captured by the monitoring system control unit 110 through the network 105. The one or more user devices 150, 160 may receive the data from the monitoring system control unit 110 through the network 105 or the monitoring application server 170 may relay data received from the monitoring system control unit 110 to the one or more user devices 150, 160 through the network 105. In this regard, the monitoring application server 170 may facilitate communication between the one or more user devices 150, 160 and the monitoring system.

In some implementations, the one or more user devices 150, 160 may be configured to switch whether the one or more user devices 150, 160 communicate with the monitoring system control unit 110 directly (e.g., through link 138) or through the monitoring application server 170 (e.g., through network 105) based on a location of the one or more user devices 150, 160. For instance, when the one or more user devices 150, 160 are located close to the monitoring system control unit 110 and in range to communicate directly with the monitoring system control unit 110, the one or more user devices 150, 160 use direct communication. When the one or more user devices 150, 160 are located far from the monitoring system control unit 110 and not in range to communicate directly with the monitoring system control unit 110, the one or more user devices 150, 160 use communication through the monitoring application server 170.

Although the one or more user devices 150, 160 are shown as being connected to the network 105, in some implementations, the one or more user devices 150, 160 are not connected to the network 105. In these implementations, the one or more user devices 150, 160 communicate directly with one or more of the monitoring system components and no network (e.g., Internet) connection or reliance on remote servers is needed.

In some implementations, the one or more user devices 150, 160 may display a heads up display (HUC), a projected hologram, a third-dimensional portrayal or a traditional user interface (e.g., smartphone, laptop, television) based on the recorded video footage collected by either the one of the cameras 130 within the property or the drone device 188. In such implementations, the pet owner may use the user interface displayed on the one or more user devices 150, 160 to remotely view footage of pet activity.

In some implementations, the system 100 may utilize the one or more user devices 150, 160 connected to the drone device 188 and the monitoring application server 170 over network 105 to enable an automated lost pet discovery and return service. For example, when a pet exits the boundaries specified by the monitoring system control unit 110, the monitoring system control unit 110 may enable the drone device 188 to track the pet using an established communication between the drone device 188 and the pet beacon 142 using a unique pet identifier. In such examples, the drone device 188 or the pet beacon 142 may transmit an alert notification to the monitoring application server 170, which may subsequently send a notification to the one or more user devices 150, 160. In some instances, the system 100 may initiate an automated pet return service using an established transportation service using the one or more user devices 150, 160 and the identified pet location using the GPS signal transmitted from either the pet beacon 142 or the drone device 188 (e.g., Uber, taxi, etc.). In other instances, the pet beacon 142 may monitor biometric data of the pet and transmit such information through embedded sensors attached to the pet beacon 142 to the one or more user devices 150, 160 to enable the pet owner to receive live updates on a lost pet.

In some implementations, the system 100 further includes network 105 and the sensors 120, the module 122, the camera 130, the thermostat 134, the pet beacon 142, the drone device 188, the pet gate 180, and the pet door 190 are configured to communicate sensor and image data to the one or more user devices 150, 160 over network 105 (e.g., the Internet, cellular network, etc.). In yet another implementation, the sensors 120, the module 122, the camera 130, the thermostat 134, the pet beacon 142, the drone device 188, the pet gate 180, and the pet door 190 (or a component, such as a bridge/router) are intelligent enough to change the communication pathway from a direct local pathway when the one or more user devices 150, 160 are in close physical proximity to the sensors 120, the module 122, the camera 130, the thermostat 134, the pet beacon 142, the drone device 188, the pet gate 180, and the pet door 190 to a pathway over network 105 when the one or more user devices 150, 160 are farther from the sensors 120, the module 122, the camera 130, the thermostat 134, the pet beacon 142, the drone device 188, the pet gate 180, and the pet door 190. In some examples, the system leverages GPS information from the one or more user devices 150, 160 to determine whether the one or more user devices 150, 160 are close enough to the sensors 120, the module 122, the camera 130, the thermostat 134, the pet beacon 142, the drone device 188, the pet gate 180, and the pet door 190 to use the direct local pathway or whether the one or more user devices 150, 160 are far enough from the sensors 120, the module 122, the camera 130, the thermostat 134, the pet beacon 142, the drone device 188, the pet gate 180, and the pet door 190 that the pathway over network 105 is required. In other examples, the system leverages status communications (e.g., pinging) between the one or more user devices 150, 160 and the sensors 120, the module 122, the camera 130, the thermostat 134, the pet beacon 142, the drone device 188, the pet gate 180, and the pet door 190 to determine whether communication using the direct local pathway is possible. If communication using the direct local pathway is possible, the one or more user devices 150, 160 communicate with the sensors 120, the module 122, the camera 130, the thermostat 134, the pet beacon 142, the drone device 188, the pet gate 180, and the pet door 190 using the direct local pathway. If communication using the direct local pathway is not possible, the one or more user devices 150, 160 communicate with the sensors 120, the module 122, the camera 130, the thermostat 134, the drone device 188, the pet gate 180, and the pet door 190 using the pathway over network 105.

In some implementations, the system 100 provides end users with access to images captured by the camera 130 to aid in decision making. The system 100 may transmit the images captured by the camera 130 over a wireless WAN network to the user devices 150, 160. Because transmission over a wireless WAN network may be relatively expensive, the system 100 uses several techniques to reduce costs while providing access to significant levels of useful visual information.

In some implementations, the system 100 may have multiple, contiguous fenced yards integrated using multiple connected pet gates 180 to allow pets from multiple properties across multiple properties to enter the contiguous fenced yards. In such implementations, the rule-based activations of the gate locks 182 for each respective connected pet gates 180 may be aggregated by the monitoring application server 170 to coordinate monitoring by the multiple pet beacons 142. For example, the individual gate locks 182 may be synchronized with specific pet beacons 142 using unique pet identifiers. In such examples, individual pet activity may be transmitted to the application monitoring server 170, which may develop a protocol for the multiple gate locks 182 included in the contiguous fenced yards for each identified pet within the enclosed area. For instance, if an interconnected gate is open, and the transmitted pet activity indicates that the pet is not allowed to enter into the neighboring gate, the monitoring application server 170 may transmit an instruction to the neighboring pet gate prohibiting the pet from entering the neighboring gate.

In some implementations, the system may utilize pet interactions for creating rules for multiple connected pet gates 180 within multiple, contiguous fenced yards. For example, if two pet owners combine their respective connected pet gates 180, the monitoring application server 170 may monitor the interactions of the pets within the contiguous fenced yards using the multiple pet beacons 142 to develop behavior-specific rules for the gate locks 182. For instance, if two pets are unable to safely co-exist within the enclosed region of the fenced yard, then the monitoring application server 170 may determine, based on the data transmitted from the pet beacons 142 (e.g., proximity between the animals, physical behavior, etc.), that the pets may need to be separated within the enclosed region. In response, the monitoring application server 170 may direct the gate locks 182 to disable the contiguous fenced yard and separate the pets within the enclosed region. In such instances, the first gate lock 182 may initially wait for the first pet to return to its enclosed region to close its enclosed region, or wait for the second pet to leave the contiguous fenced yard.

In some examples, the drone device 188 for the respective pet beacons 142 for multiple pets within multiple, contiguous fenced yards may hover over the properties to collect a video feed of pet interactions. In such examples, the video feed may be forwarded to pet owners outside the property to provide remote monitoring services. For instance, the drone device 188 may periodically monitor the pets within the multiple, contiguous fenced yards to ensure that there is no issues within the enclosed region.

Figure 2:
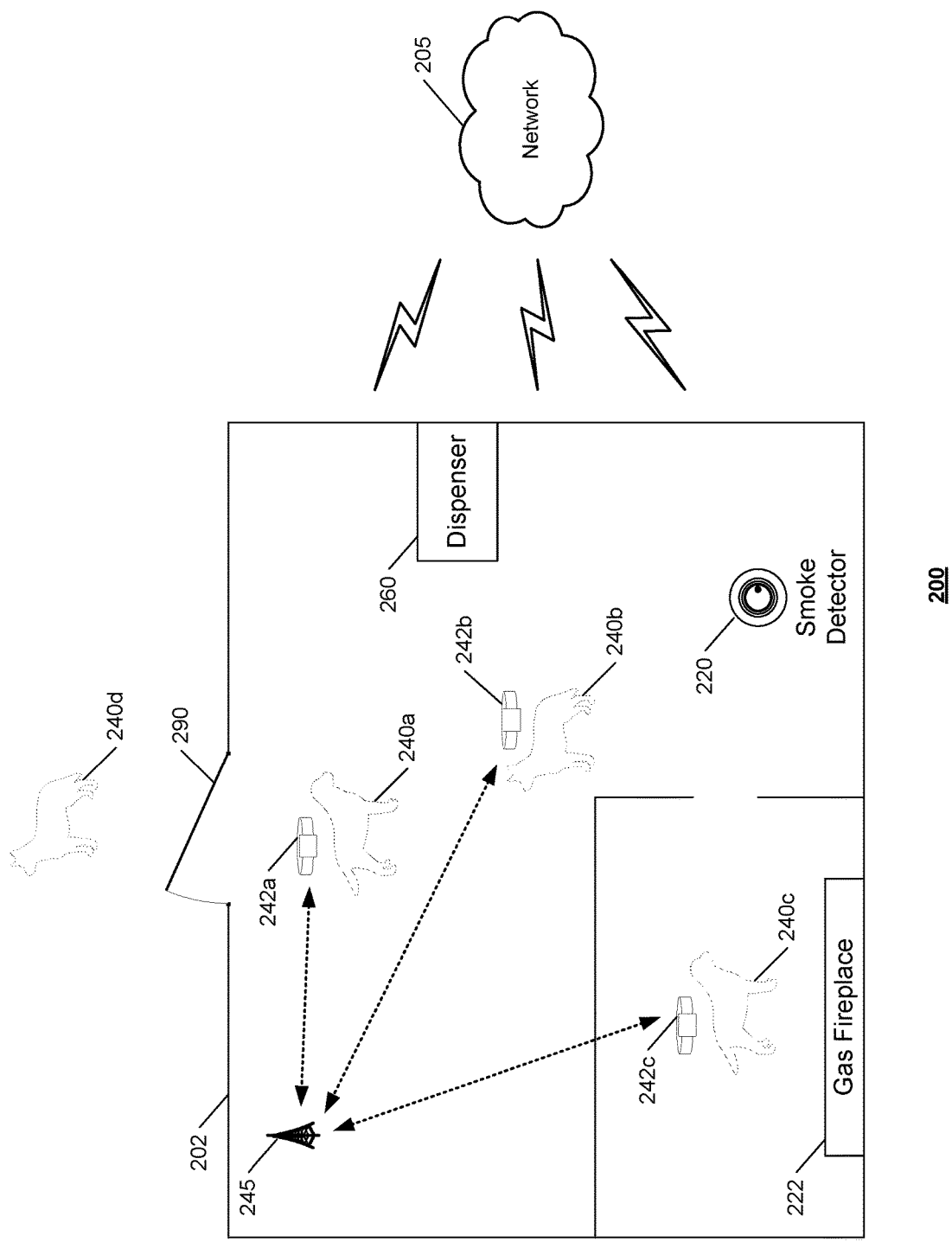
FIG. 2 illustrates an example system for controlling aspects of a property based on pet monitoring.

FIG. 2 depicts an example monitoring system 200 for performing pet monitoring at a property. Briefly, the example monitoring system 200 is associated with a property 202 that is associated with three pets 240a-240c that are each equipped with a respective beacon 242a-242c. The monitoring system 200 is associated with components including a smoke detector 220, a fireplace 222, a treat dispenser 260, and a pet door 290, and may be associated with other sensors and/or appliances of the property 202. The monitoring system 200 also includes one or more beacon detectors 245 that are configured to detect the beacons 242a-242c. The monitoring system 200 may exchange electronic communications with the various components, including the smoke detector 220, fireplace 222, beacon detector 245, and treat dispenser 260, to determine the locations of the pets 240a-240c, to control the components, and to receive sensor data relevant to the property 202.

Thus, the monitoring system 200 is configured to receive data from the components of the monitoring system and to control the components of the monitoring system based on the received data. For example, the pet door 290 may be configured such that the pet door 290 is locked by default. Based on receiving data indicating that a pet that is authorized to use the pet door 290 to go outside is proximate to the pet door 290, the monitoring system 200 may control the pet door 290 to unlock the pet door 290, such that the authorized pet is capable of using the pet door 290. In FIG. 2, the pet 240a may be authorized to use the pet door 290, for example, based on a programmed schedule for the pet 240a specifying that the pet 240a is authorized to use the pet door 290 at the present time. The pet door 290 may remain locked so that other pets, such as the pet 240d that is not associated with the property 202 or the pet 242b that is associated with the property 202 may not be capable of entering or exiting the property 202 via the pet door 290.

For instance, the beacon detector 245 may detect the beacon 242a corresponding to the pet 240a, and may determine that the beacon 242a is located near the pet door 290. The monitoring system 200 may determine that the pet 240a associated with the beacon 242a detected near the pet door 290 is authorized to use the pet door 290, for instance, based on determining that a programmed schedule stored by the monitoring system 200 permits the pet 240a to use the pet door 290 at the present time. Based on determining that the pet 240a is permitted to use the pet door 290, the monitoring system 200 may transmit data to the pet door 290 over the network 205 that causes the pet door 290 to unlock to permit the pet 240a to use the pet door 290. The pet door 290 may remain unlocked until the monitoring system 200 receives data from the beacon detector 245 indicating that the pet 240a is no longer proximate to the pet door 290, when the monitoring system may transmit data to the pet door 290 to cause the pet door 290 to relock. Additionally or alternatively, the monitoring system 200 may transmit data to relock the pet door 290 based on determining that a pet 240d that is not associated with the property 202 is near the pet door 290. Similarly, the monitoring system 200 may transmit data to relock the pet door 290 based on receiving data from the beacon detector 245 indicating that the beacon 242b corresponding to the pet 240b is proximate to the pet door 290 and based on determining that a schedule associated with the pet 240b does not permit the pet 240b to use the pet door 290 at the present time.

In another example, the monitoring system 200 may determine to override conditions on when the pet door 290 should be unlocked, based on detecting a condition that is considered an emergency condition. For example, the monitoring system 200 may obtain data from the smoke detector 220 indicating that smoke has been detected and that a fire may exist in the property 202. In response to the information indicating that there may be a fire at the property 202, the monitoring system 200 may determine to override one or more conditions on unlocking the pet door 290, and may instead determine to transmit data to the pet door 290 that causes the pet door 290 to unlock, in order to allow the pets 240a-240c associated with property 202 to escape the property 202 and the potential fire.

In other examples, the monitoring system 200 controls other components associated with the property 202, such as the fireplace 222. The monitoring system 200 may receive data from the beacon detector 245 indicating that a location of the beacon 242c corresponding to the pet 240c is located proximate to the fireplace 222. The monitoring system 200 may additionally obtain data indicating that the fireplace 222 is currently turned on. In response to determining that the pet 240c is located proximate to the fireplace 222 and that the fireplace 222 is turned on, such that it might pose a hazard to the pet 240c, the monitoring system 200 may transmit data to the fireplace 222 over the network 205 that controls the fireplace 222 to turn off or to reduce its output so that it is a lesser hazard to the pet 240c.

In still other examples, the monitoring system 200 may control a treat dispenser 260 that is configured to provide treats or other items, such as a food, water, toys, or other items, to a pet. For example, the monitoring system 200 may have a schedule that indicates when a particular pet may receive a treat, food, water, or other items. The monitoring system 200 may determine that the schedule specifies that a treat, food, water, or other item is to be provided to the pet at the present time, and based on the determination may transmit data to the treat dispenser 260 that causes the treat dispenser 260 to dispense the treat, food, water, or other item.

In other examples, the monitoring system 200 may control the treat dispenser 260 to provide a notification, such as an audible call to a pet, or to dispense an item in order to elicit a desired response from a pet. For example, the monitoring system 200 may receive data from the beacon detector 245 that indicates that one or more of the pets 240a-240c is located outside of the property 202. The monitoring system 200 may further determine that a schedule specifies that none of the pets 240a-240c are to be outside at the present time, for example, after a specified time at night. To encourage the one or more of the pets 240a-240c to come inside the property 202, the monitoring system 200 may transmit data over the network 205 to the pet door 290 to unlock the pet door 290, and to the treat dispenser 260 to cause the treat dispenser 260 to cause the treat dispenser 260 to output an audible call to the one or more of the pets 240a-240c and to dispense a treat to encourage the one or more of the pets 240a-240c to reenter the property 202. In some examples, after receiving data from the beacon detector 245 indicating that the one or more of the pets 240a-240c have reentered the property 202, the monitoring system 200 may transmit data to the pet door 290 to lock the pet door 290, and to the treat dispenser 260 to control the treat dispenser 260 to stop outputting the audible call to the one or more of the pets 240a-240c.

In addition to the example responses shown in FIG. 2, the monitoring system 200 may be configured to perform other operations based on detecting events, and may be configured to react to different events. For example, if the monitoring system 200 receives information from the smoke detector 220 indicating that smoke has been detected in the property 202, the monitoring system 200 may also notify emergency services such as a fire department of the potential fire at the property 202. Other operations may be performed by the monitoring system 200 to control components associated with the monitoring system, or to respond to events that are relevant to the pets 240a-240c associated with the property 202.

Figure 3:
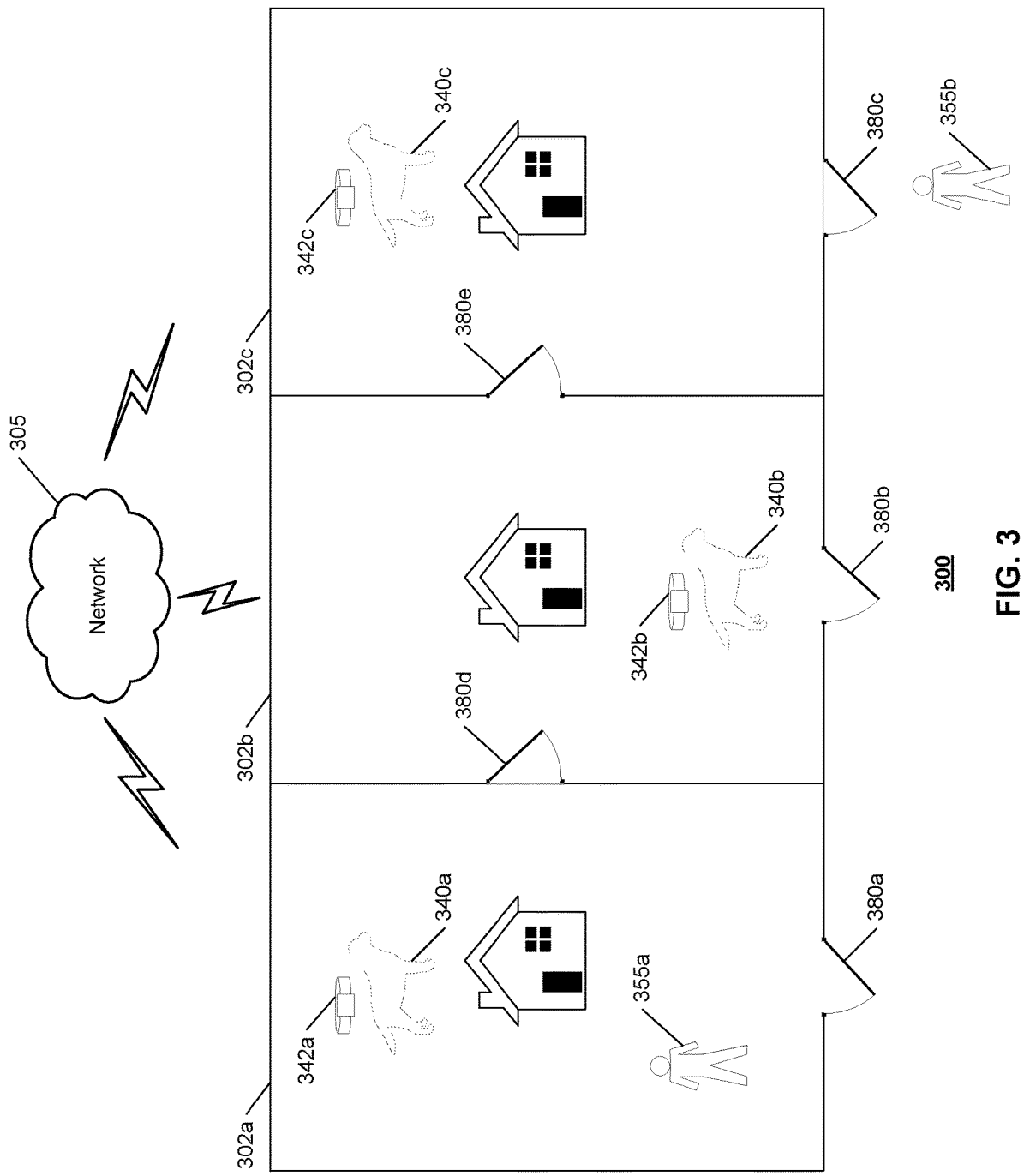
FIG. 3 illustrates an example system for controlling aspects of a property based on monitoring pets at multiple properties.

FIG. 3 depicts an example monitoring system 300 in which pet tracking is performed across multiple properties 302a-302c. Each of the properties 302a-302c may be associated with multiple fences 380a-380e that may be controlled by the monitoring system 300 and that may permit people or pets to use the fences 380a-380e to move between the properties 302a-302c and/or to move in or out of a particular one of the properties 302a-302c. In some implementations, the monitoring system 300 may control the fences 380a-380e to either open or close the fences 380a-380e based on monitoring the presence of people and or beacons 342a-342c corresponding to pets 340a-340c that are associated with the respective properties 302a-302c. Additionally, the monitoring system 300 may control the fences 380a-380e based on patterns of behavior for the pets 340a-340c, based on patterns of behavior of the interactions of the pets 340a-340c with people, such as users 355a-355b, based on patterns of behavior of the interactions of the pets 340a-340c with one another, or based on other factors, such as schedules that have been predetermined for the pets 340a-340c and that are followed by the monitoring system 300.

For example, at property 302a, the monitoring system 300 may determine that the beacon 342a corresponding to the pet 340a is located outside on the premises of the property 302a, and may also determine that a user 355a is outside on the premises of the property 302a. The monitoring system 300 may receive this information over the network 305 from one or more sensors or other components associated with the property 302a, such as a beacon detector similar to the beacon detector 245 of FIG. 2, a camera sensor configured to detect the presence of people or pets in images, or based on other sensory data. The monitoring system 300 determines based on the received data indicating the locations of the beacon 342a and user 355a, and optionally based on other information such as a schedule or settings for the pet 340a or for the property 302a, to open the fence 380a. By opening the fence 380a, the pet 340a or the user 355a may be able to enter or exit the premises of the property 302a using the fence 380a. The monitoring system 300 may continue to monitor the locations of the beacon 342a, the user 355a, or other information relevant to controlling the fence 380a, and based on the continued monitoring may later determine to close the fence 380a.

Similarly, the property 302b may have a fence 380b that is positioned to allow entry and exit from the premises of the property 302b. The monitoring system 300 may receiving information from the property 302b and may determine, based on the received information, whether to open or close the fence 380b. For example, as shown in FIG. 3, the monitoring system 300 may receiving information over the network 305 that indicates that a beacon 342b corresponding to a pet 340b is located outside at the property 302b. The monitoring system 300 may also access other information relating to the property 302b, such as information indicating that the pet 340b has a tendency to run away, or that a user associated with the property 302b has configured settings for the monitoring system such that the fence 380b should be closed unless a user of the property 302b is outside on the premises of the property 302b. Based on the information received indicating that the pet 340b is located outside and the other information relating to the property 302b, the monitoring system 300 may determine to close or not to open the fence 380b.

Property 302c may also have a fence 380c that is positioned to allow entry and exit from the property 302c. The monitoring system 300 may be configured to open or close the fence 380c based on data received from the property 302c. For example, in FIG. 3 the monitoring system 300 may receive information that indicates that a beacon 342c corresponding to a pet 340c associated with the property 302c. The monitoring system 300 may also receive information indicating that a person 355b is located outside of the premises of the property 302c. For example, a camera monitoring the premises of the property 302c may detect the presence of the person 355b outside of the premises of the property 302c. In some instances, the monitoring system 300 may attempt to identify the person 355b. For example, the monitoring system 300 may identify the person 355b based on performing facial recognition on an image of the person 355b, may identify the person 355b based on determining that the person 355b has a mobile device corresponding to a particular identity, or may otherwise identify the person 355b. The monitoring system 300 may determine whether to open or close the fence 380c based on the received information indicating the presence of the pet 340c outside at the property 302c and the person 355b. For example, if the monitoring system 300 determines that the person 355b is a resident of the property 302c or frequently visits the property 302c, the monitoring system 300 may open the fence 380c to permit the person 355b to enter the property. Alternatively, if the monitoring system 300 determines that the person 355b is not a resident or frequent visitor of the property 302c, the monitoring system 300 may determine not to open the fence 380c.

The properties 302a and 302b also share a fence 380d that can permit movement between the properties 302a and 302b. The monitoring system may control the fence 380d based on data received from the properties 302a and 302b. For example, the monitoring system 300 may receive over the network 305 data indicating that the beacon 342a corresponding to the pet 340a is outside at the property 302a, that the person 355a is located outside at the property 302a, and that the beacon 342b corresponding to the pet 340b is located outside at the property 302b. The monitoring system 300 may also access information relevant to determining how to control the fence 380d. For example, the monitoring system 300 may access data indicating whether the pets 340a and 340b are permitted to be in the same area, such as information indicating whether the pets 340a and 340b play together well or fight. The monitoring system 300 may receive information from the properties 302a and 302b indicating the status of other components of the properties 302a, 302b, such as whether the fences 380a, 380b are open. Other information may be relevant to determining whether to open or close the fence 380d, such as whether the pet 340b is permitted around other people, such as the person 355a, without an owner present, whether the person 355a is allergic to the pet 340b, or other information. Based on the information received from the properties 302a and 302b, and the accessed information relating to the pets 340a, 340b, person 355a, or properties 302a, 302b, the monitoring system 300 may determine to open the fence 380d to allow the pets 340a, 340b to interact, or may close the fence 380d to prevent the pets 340a, 340b from interacting.

Similarly, the monitoring system 300 may be capable of controlling the fence 380e that connects the properties 302b and 302c and allows movement between the two properties 302b, 302c. To determine how to control the fence 380e, the monitoring system 300 receives information from each of the properties 302b, 302c. For example, the monitoring system 300 may receive data over the network 305 that indicates that the beacon 342b corresponding to the pet 340b is located outside at the property 302b, and that the beacon 342c corresponding to the pet 340c is located outside at the property 302c. The monitoring system 300 may access other information relevant to determining whether to open or close the fence 380e. For example, the monitoring system 300 may determine whether the fences 380b and 380c associated with the properties 302b and 302c are open or closed, whether the pets 340b, 340c are permitted to interact without having an owner present, whether the pets 340b, 340c are friendly with each other and permitted to interact, or may access other information. Based on the information received from the properties 302b, 302c and the accessed information, the monitoring system 300 may determine to open or close the fence 380e. For example, based on determining that the pets 340b, 340c are friendly and permitted to interact, and determining that the fences 380b and 380c are closed at the time, the monitoring system 300 may open the fence 380e to permit the pets 340b, 340c to interact. Alternatively, based on determining that the pet 340c is an aggressive pet, that a gate 380b or 380c, or that one of the pets 340b, 340c is not permitted to interact with other pets unless an owner is present, the monitoring system 300 may determine to close the fence 380e.

While the monitoring system 300 has been described thus far as opening or closing fences 380a-380e, in some implementations the monitoring system 300 may perform operations to lock or unlock the fences 380a-380e, or may perform other operations with respect to fences 380a-380e, such as providing visual or audible indications of which of the fences 380a-380e are lock or unlocked.

Figure 4:
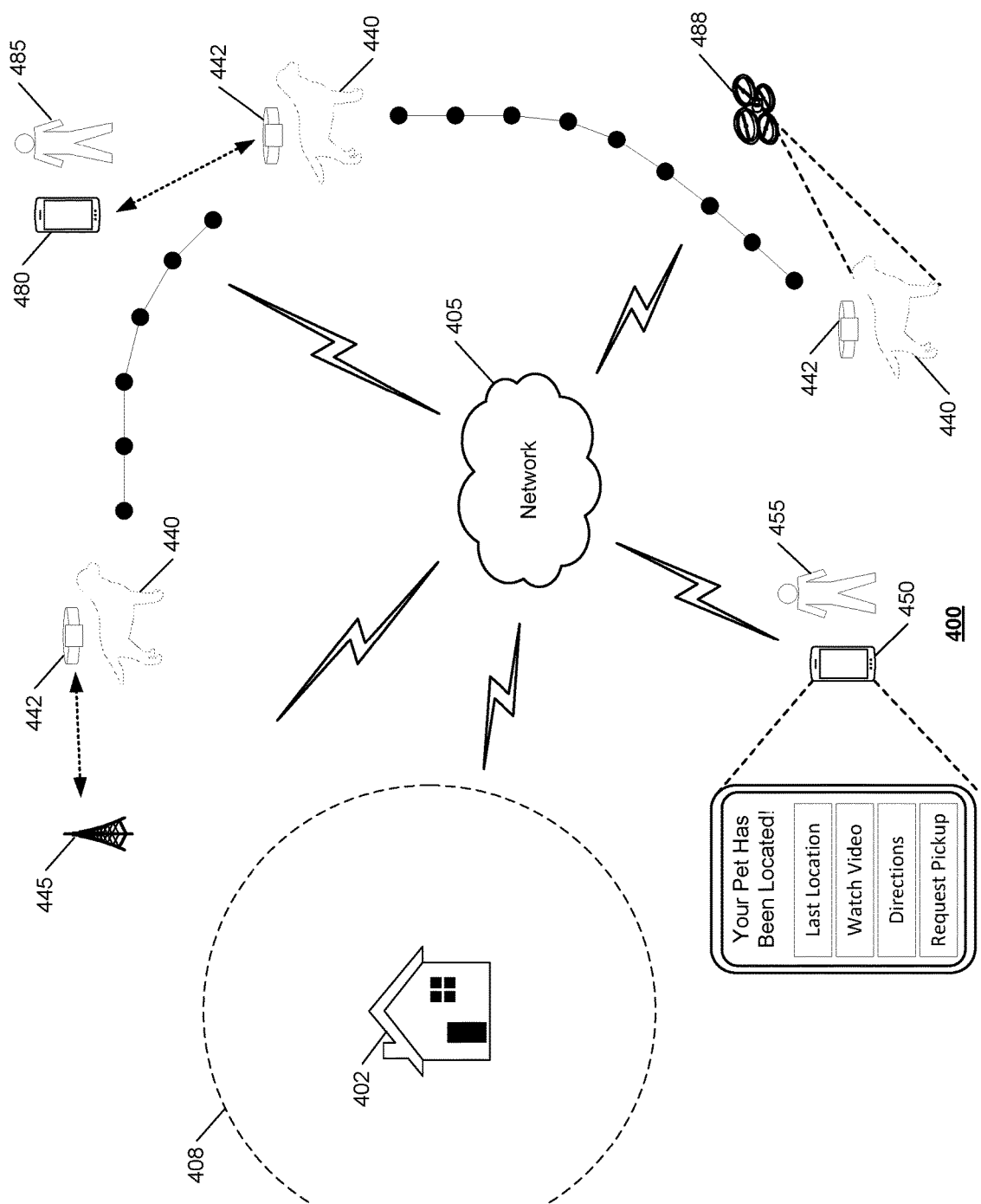
FIG. 4 illustrates an example system for locating a lost pet.
Figure 6:
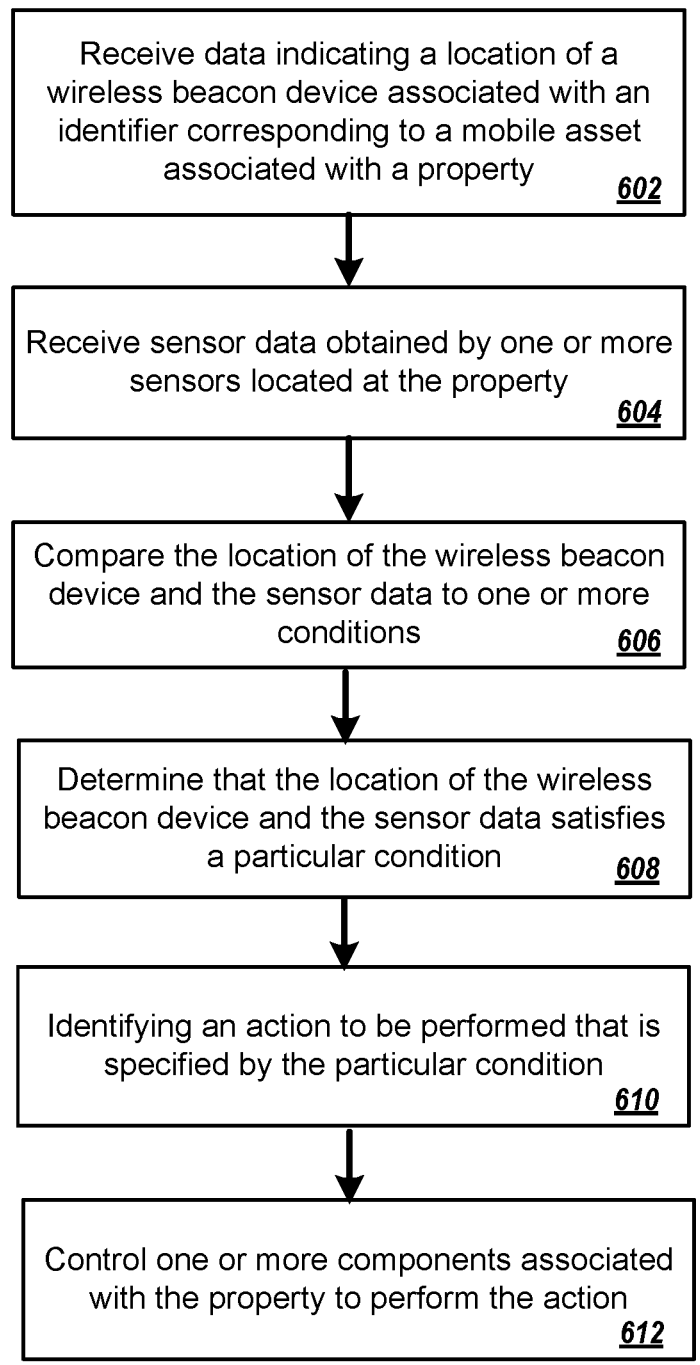
FIG. 6 depicts an example process.

FIG. 4 depicts a monitoring system 400 that is configured to locate and monitor a pet 440 that is lost or has escaped from a property 402. Briefly, the pet 440 may be equipped with a beacon 442 that corresponds to the pet and that, when detected, uniquely identifies the pet 440. For example, the beacon 442 may be integrated into a collar of the pet 440, into the body of the pet 440, or otherwise secured to the pet 440, such that the location of the beacon 442 indicates the location of the pet 440.

The monitoring system 400 also includes devices configured to locate the beacon 442 that corresponds to the pet 440, including one or more pet stations 445 that each correspond to a particular location and are configured to detect the location of the beacon 442. Additionally or alternatively, one or more people 485 may each have a user device 480 that is configured to run a native surveillance application, wherein the surveillance application enables the user device 480 that it is running the surveillance application to detect the location of the beacon 442. For example, each of the people 485 may be subscribers to a service performed by the monitoring system for locating and monitoring pets, or may be other dog owners or "Good Samaritans" who have installed the surveillance application on their user device. Additionally, the monitoring system 400 may include one or more drones 488 that are each configured to detect or navigate to the location of the beacon 442, and optionally to track the location of the beacon 442, or monitor the pet 440, for example, using a camera included in the drone 488. In some implementations, the monitoring system 400 may be operated as a service for tracking or locating pets, and therefore may be capable of locating any number of beacons that correspond to pets that are enrolled in the service. Each of the components of the monitoring system 400, including those at the property 402, the pet stations 445, user devices 450, and drones 488 may be able to exchange electronic communications over the network 405. For example, the components may exchange communications with one or more monitoring application servers or monitor control units discussed with respect to FIG. 1.

The monitoring system 400 may also be associated with a user 455 having a user device 450 that is able to exchange electronic communications with other components of the monitoring system 400. For example, the user 455 may be a resident of the property 402 having the associated pet 440, and the user 455 may subscribe to a service in which the monitoring system 400 locates and/or monitors the pet 440 if they are lost. As a part of the service, the user 455 may install an application on their user device 450 that enables the user device 450 to exchange electronic communications with the monitoring system 400 over the network 405 that include information or instructions relating to the locating and monitoring of the pet 440.

In some implementations, components of the monitoring system 400 may monitor the location of the beacon 442 at the property 402. For example, the property 402 may be equipped with one or more beacon detectors, cameras, or other sensing devices configured to detect the beacon 442 and to determine or provide an indication of the possible location of the beacon 442 within the property 402. The property 402 may be associated with a boundary 408 that indicates an acceptable area in which the pet 440 may be located, such that if the pet 440 goes beyond the boundary 408 the monitoring system 400 will consider the pet 440 to be lost.

When the monitoring system 400 determining that the pet 440 is lost based on data received from components associated with the property 402, the monitoring system 400 may perform operations to locate the pet 440. For example, the monitoring system 400 may cause a notification to be provided to the user device 450 of the user 455 indicating that the pet 440 has left the boundary of the property 402, and therefore might be lost. Additionally, the monitoring system 400 may provide notifications to one or more of the user devices 480 indicating the pet 440 may be lost, for example, by sending a push notification to user devices 480 that are proximate to the property 402 indicating that the pet 440 might be lost and providing a description of the pet 440. Additionally or alternatively, based on determining that the pet 440 may be lost, the monitoring system 400 may provide information to one or more of the pet stations 445 or the surveillance application instances operating on one or more of the user devices 480 indicating that the pet 440 may be lost and notifying the pet stations 445 and/or surveillance applications to report detection of the beacon 442 corresponding to the pet 440 to assist with finding the lost pet 440. In some implementations, the monitoring system 400 may dispatch one or more drones 488 to navigate to a possible location of the beacon 442 corresponding to the pet 440, where the drone 488 may perform various operations for tracking the pet 440, monitoring the pet 440, or assisting with the return of the pet 440 to the property 402.

For example, after the monitoring system 400 has determined that a beacon 442 corresponding to the pet 440 has left a boundary 408 of the property 402, the monitoring system may classify the pet 440 as possibly being lost or having escaped from the property 402. In some implementations, the monitoring system 400 may only classify the pet 440 as being lost or having escaped from the property 402 if the monitoring system determines that the pet 440 went beyond the boundary 408 without human accompaniment, or without a user of the property 402 indicating that the pet 440 may leave the boundary 408 of the property 402 without human accompaniment. In other examples, the pet 440 may only be classified as lost or escaped if a user, such as the user 455, provides input to the monitoring system 400, for example using the application installed on their mobile device 450, indicating that he pet 440 is lost or has escaped.

Based on determining that the pet 440 is lost or has escaped, the monitoring system 400 can provide information to one or more pet stations 445 over the network 405 to indicate that the pet 440 may be lost, and instructing the pet stations 445 to report any detection of the beacon 442 corresponding to the pet 440. For example, the monitoring system 400 may transmit data to the pet stations 445 that indicates an identifier of the beacon 442 that corresponds to the pet 440, such that detection of the beacon 442 having the identifier by a pet station 445 causes the pet station 445 to transmit information indicating that the beacon 442 corresponding to the pet 440 has been detected. For example, a pet station 445 may be activated based on the beacon 442 coming within a range of the pet station 445. When the pet station 445 is activated by the beacon 442, the pet station 445 may report its location or a determined location of the beacon 442, to indicate an estimated location of the pet 440.

Each of the one or more pet stations 445 may be capable of detecting and reporting a location of the beacon 442 corresponding to the pet 440, such that the monitoring system 400 can generate an estimated location of the pet 440. For example, the monitoring system 400 may estimate the location of the pet 440 based on a most recently reported location of the beacon 442 by a pet station 445. In other implementations, the monitoring system 400 may estimate the location of the pet 440 by determining a trajectory or course taken by the pet 440 based on multiple pet stations 445 detecting the beacon 442, and estimating a present location of the pet 440 based on the trajectory or course of the pet 440.

Additionally or alternatively, based on determining that the pet 440 has been lost or escaped from the property 402, the monitoring system 400 may control one or more surveillance applications operating on user devices 480 to detect the beacon 442 corresponding to the lost pet 440. For example, the monitoring system 400 may provide information to surveillance application instances running on the one or more user devices 440 to notify or configure the user devices 480 to detect the beacon 442. For example, data indicating an identifier of the beacon 442 corresponding to the pet 440 may be transmitted to the user devices 480 to instruct the user devices 480 to report any detection of the beacon 442 corresponding to the lost pet 440. After being configured to detect the beacon 442, a user device 480 running the surveillance application may detect the pet beacon 442. For example, the surveillance application may determine that the user device 480 has detected the beacon 442 proximate to the user device 480, or may determine that the beacon 442 has activated a beacon detector associated with the user device 480.

Based on determining that the beacon 442 corresponding to the pet 440 is proximate to the user device 480, a location of the pet 440 may be estimated and reported. For example, the user device 480 may report its current location at the time it detected the beacon 442, to provide an estimated location of the beacon 442. In other examples, the monitoring system 400 may estimate the location of the location of the pet 440 based on multiple detections of the beacon 442 by components of the monitoring system 400. For example, the monitoring system 400 may determine that the beacon 442 corresponding to the pet 440 has been detected at multiple locations, and based on the multiple locations may determine a trajectory or likely course of the pet 440. The monitoring system 400 may estimate the location of the pet 440 based on the trajectory or course of the pet 440, and may provide an indication of the estimated location to the user device 450 of the user 455.

In some implementations, based on determining that the pet 440 has left the boundary 408 of the property 402, the monitoring system 402 may deploy one or more drones 488 to locate the beacon 442 and monitor the pet 440 once located. For example, the one or more drones 488 may be, by default, stored in charging or docking stations that are located at the property 402, in the neighborhood of the property 402, or otherwise proximate to the property 402. When the monitoring system 400 determines that the pet 440 has left the property 402, the monitoring system 400 may deploy the drones 488 to locate the beacon 442 of the pet 440 and to monitor the pet 440.

For example, the drones 488 may be instructed to go to an estimated location of the pet 440. If the beacon 442 is a GPS device, the estimated location of the beacon 442 may be the location determined by the GPS. Alternatively, if the monitoring system 400 tracks the location of the pet 440 at the property 402 using other means, such as beacon detectors that are configured to detect the beacon 442, then an estimated location of the beacon 442 may be a location of a beacon detector that has detected the beacon 442, a location of a beacon detector that most recently detected the presence of the beacon 442, a location that is estimated based on a determined trajectory or course of the pet when it left the boundary 408, or may be a location that is otherwise determined as a best hypothesis for the location of the beacon 442.

The drones 488 may be instructed to navigate to the estimated location of the beacon 442. Having navigated to the estimated location, the drones 488 may be capable of locating the beacon 442 corresponding to the pet 440. For example, each of the drones 488 may be equipped with a beacon detector that enables a drone 488 to detect the presence of the beacon 442. Additionally or alternatively, the drones 488 may be equipped with cameras that are configured to record video and to identify pet 440 from the video. For instance, the drones 488 may be capable of performing image recognition of the pet 440 by comparing image features determined from frames of video to image features of previously received images of the pet 440. Other mechanisms may be used by the drones 488 to locate the beacon 442 and the pet 440. For example, the drones 488 may receive information indicating a location of a pet station 445 or a user device 480 that has detected the beacon 442, and may be instructed to navigate to the indicated location to locate the beacon 442.

The drones 488 may continue to perform operations to track and monitor the pet 440 after it has been located. For example, a drone 488 that has located the pet 440 may record video of the pet 440, and the video may be transmitted over the network 405 such that the video of the pet 440 can be viewed at the user device 450 or at another computing device associated with the property 402 or monitoring system 400. The drone 488 may attempt to herd or encourage the pet 440 to move toward the property 402, or may allow an owner of the pet 440 to hold a video or voice call with the pet 440 via the drone 488 to allow the owner to encourage the pet home. For example, the user 455 may be able to hold a voice or video call with the pet 440 via the drone 488 and the user device 450 based on establishing a voice or video call between the drone 488 and user device 450 over the network 405.

In other implementations, a drone 488 may be able to interact with someone who finds the pet 440 while the drone 488 is present, for example, by providing the person with directions on how to return the pet 440 to the property 402, with a message indicating whether the pet 440 is dangerous, with a message asking the person to wait with the pet 440 until an owner arrives to pick up the pet 440, and optionally indicating how long until the owner arrives or a location of the owner, or may provide instructions to the person to accompany the dog and to follow the drone 488 back to the property 402 to return the pet 440 to the property 402. In some instances, the monitoring system 400 may enable the user 455 or another user associated with the property 402 to conduct a video or voice call with a person who finds the pet 440. A drone 488 may be configured to hover over, or to otherwise continuously monitor and track the location of the pet 440 after it has been located, to allow for continuous monitoring of the location and well-being of the pet 440 until it can be found and returned to the property 402.

In some instances, based on locating the pet 440, the monitoring system may call upon an automated pet return service to return either the pet 440 or a finder of the pet 440 who has control of the pet 440 to the property. For example, based on one or more pet stations 445, user devices 480, or drones 488 detecting the location of the beacon 442 corresponding to the pet 440, the monitoring system may dispatch an automated pet return service (e.g., by contacting a shared driving service) to an estimated location of the beacon 442 corresponding to the pet. An employee of the automated pet return service may be able to navigate to the estimated location of the pet 440 to take control of the pet 440 and return the pet 440 to the property 402.

In some implementations, information regarding the status of a pet 440 may be provided to the user 455 associated with the property 402 via their user device 450. For example, the monitoring system 400 may be capable of providing information for display at the user device 450 via an application installed at the user device 450. Such information may include, at any time, an estimated location of the pet 440, health metrics of the pet 440, or other information associated with the pet 440. If the pet 440 has been identified as lost, then the user device 450 may be capable of providing additional information relating to the search and return of the pet 440 to the property 402. For example, as shown in FIG. 4, the monitoring system 400 may enable the user 455 to view information at their mobile device 450 that indicates a "Last Location" of the pet 440 estimated by the monitoring system 400, or may enable the user 455 to "Watch Video" of the pet 440, where selection of the "Watch Video" option by the user 455 enables viewing of video or images of the pet 440 obtained by a drone 488, a camera associated with a pet station 445, or a camera associated with a user device 480. The monitoring system 400 may be capable of determining driving or other directions to an estimated location of the pet 440, and based on a user selection of the "Directions" option may be capable of providing the user 455 of the property 402 with directions to the estimated location of the pet 440 at the user device 450. The application running on the user device 450 may also include a "Request Pickup" option that notifies an automated pet return service to pick up the pet 440 at an estimated location to be returned to the property 402, or to pick up a finder of the pet 440 along with the pet 440 at an estimated location to be returned to the property 402. Other functions or information may be provided at the user device 450 of the user 455 who is associated with the property 402. For example, information indicating whether the pet 440 has been located by a component of the monitoring system 400 may be presented at an application interface provided at the user device 450.

FIG. 5 depicts a flow chart of an example process 500 performed by a monitoring system for locating a pet that is lost or has escaped from a property. In some implementations, the process 500 may be performed by the system 100 of FIG. 1, or may be performed by a monitoring system having additional or different components from the system 100 of FIG. 1.

A monitoring system configured to monitor a property receives, from a beacon monitoring device that is associated with the monitoring system, data indicating a location of a wireless beacon device that has been detected by the beacon monitoring device, and an identifier that is associated with the wireless beacon device, wherein the identified corresponds to a mobile asset that is associated with the property (502). For example, when a mobile asset associated with the property is a pet, the monitoring application server 170 or monitoring system control unit 110 of the system 100 may receive data that indicates that a particular pet station, user device, drone, or other beacon monitoring device associated with the system 100 that is configured to detect a pet beacon 142 has detected the pet beacon 142. The data received by the monitoring application server 170 or monitoring system control unit 110 may indicate a location of the pet beacon 142 determined by the beacon monitoring device, as well as an identifier of the beacon 142 that corresponds to a pet of the property that the system 100 is configured to monitor.

The monitoring system determines that the location of the wireless beacon device is outside of an area that defines permissible locations of the mobile asset that is associated with the property (504). For example, the monitoring system control unit 110 may have settings that specify a boundary of a property associated with the system 100, where the boundary of the property defines an area of permissible locations where the mobile asset is permitted to be. Based on the data indicating the detected location of the wireless beacon device, such as the pet beacon 142 corresponding to a pet associated with the property, the monitoring system control unit 110 may determine that the location of the pet beacon 142 is outside of the established boundary of the property, and may therefore determine that the pet having the pet beacon 142 is outside of the area where the pet is permitted to be.

The monitoring system determines, based at least on the determination that the location of the wireless beacon device is outside of the area that defines permissible locations of the mobile asset that is associated with the property, to dispatch a robotic device to the location of the wireless beacon device (506). For example, based on determining that the pet beacon 142 is located outside of the boundary of the property associated with the system 100, the monitoring system control unit 110 may determine to dispatch a drone 188 to locate and track the pet associated with the pet beacon 142. In some instances, determining whether to dispatch a drone 188 to locate and track the pet may involve consideration by the monitoring system control unit 110 of various other factors, such as the presence of humans at the property associated with the system 100 that might be able to locate the pet faster or more readily than the drone 188, the range of the drone 188 relative to the estimated location of the pet beacon 142, or based on other factors.

The monitoring system identifies a particular robotic device to dispatch based on the determination to dispatch a robotic device to the location of the wireless beacon device (508). For example, the system 100 may have multiple drones 188 that are capable of locating an monitoring pets that correspond to the pet beacon 142. Based on determining to dispatch a drone to the location of the pet beacon 142, the monitoring system control unit 110 may select a particular drone 188 to dispatch from among the multiple drones 188. In some implementations, the monitoring system control unit 110 may determine to dispatch a particular drone 188 based on the location of the pet beacon 142, based on current battery life of the particular drone 188, based on the capabilities or features of the particular drone 188, or based on other considerations. For example, the monitoring system control unit 110 may identify a particular drone 188 that has adequate range and battery life to navigate to the location of the pet beacon 142 and to monitor the pet at that location for some time before returning to the property associated with the system 100. The monitoring system control unit 110 may identify the particular drone 188 based on features of the particular drone 188, such as capabilities of the particular drone to record and transmit video, to enable a video or voice call between the drone 188 and user devices 150, 160, or based on other factors.

The monitoring system transmits a command to the particular robotic device that instructs the particular robotic device to navigate to the location of the wireless beacon device (510). For example, the monitoring system control unit 110 of FIG. 1 may transmit data to the particular drone 188 that instructs the particular drone 188 to navigate to the determined location of the pet beacon 142. In response to the command, the particular drone 188 may launch from a docking station that is configured to charge the particular drone 188, and to navigate to the location of the pet beacon 142. In some instances, the particular drone 188 may be provided with directions to navigate to the location of the pet beacon 142 by the monitoring system control unit 110 or another component of the system 100, or the particular drone 188 may determine directions to the location of the pet beacon 142 without receiving directions from another source. Additionally, the particular drone 188 may be instructed to perform various operations when it arrives at the location of the pet beacon 142, such as to attempt to locate the pet beacon 142 using its own beacon detection device, to begin recording video of the pet associated with the pet beacon 142, or to perform other operations. The particular drone 188 may be configured to receive instructions over a network, such as the network 105, that instructs the particular drone 188 to perform certain operations, such as operations specified by a user at a user device 150, 160.

While the disclosed system and methods have been described primarily in the context of pet security monitoring and tracking, in other implementations similar systems or methods may be applied to security monitoring and tracking of other mobile assets. For example, a mobile asset associated with a property may be an automobile, boat, or other vehicle, may be a valuable item such as a painting, jewelry, or family heirloom, may be a person, such as a student or child resident of a property, or may be any other mobile person or thing that can benefit from technology that is configured to monitor the location and characteristics of the person or thing.

The described systems, methods, and techniques may be implemented in digital electronic circuitry, computer hardware, firmware, software, or in combinations of these elements. Apparatus implementing these techniques may include appropriate input and output devices, a computer processor, and a computer program product tangibly embodied in a machine-readable storage device for execution by a programmable processor. A process implementing these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made. For example, other useful implementations could be achieved if steps of the disclosed techniques were performed in a different order and/or if components in the disclosed systems were combined in a different manner and/or replaced or supplemented by other components. Accordingly, other implementations are within the scope of the disclosure.

What is claimed is:

1. An electronic property monitoring system comprising:
one or more processors; and
one or more storage devices storing instructions that, when executed by the one or more processors, cause the electronic property monitoring system to perform operations, the operations comprising:
obtaining first time data, wherein the first time data describes a first time of day;
obtaining first sensor data generated by one or more monitoring system devices,
wherein the first sensor data describes first weather conditions on the outside of the property;
determining, based on the first time data and the first sensor data, whether a first connected door of the property is to be opened, wherein the determining comprises:
determining that the first time data satisfies a predetermined time rule for opening the first door; and
determining that the first sensor data satisfies a predetermined weather rule for allowing a monitored asset to exit the property;
based on determining that the first connected door is to be opened and before opening the first door, determining whether a first status of a second connected door of the property is open or closed; and
based on a determination that the second connected door of the property is closed:
transmitting an instruction to the first connected door to cause the first connected door to open.

2. The property monitoring system of claim 1, wherein property monitoring system comprises an application monitoring server and a monitoring system control unit.

3. The property monitoring system of claim 1, wherein the monitoring system devices include one or more of a camera, a drone, a climate sensor, a motion sensor, or a transmitter of a tracking device attached to the monitored asset.

4. The property monitoring system of claim 3, wherein the climate sensor includes one or more of a rain sensor, a humidity sensor, an outdoor temperature sensor, a light sensor, or a wind sensor.

5. The property monitoring system of claim 1, the operations further comprising:
based on a determination that the second connected door of the property is open:
transmitting an instruction to the second connected door to cause the second connected door to close; and
after determining that the second connected door has closed, transmitting an instruction to the first connected door to cause the first connected door to open.

6. The property monitoring system of claim 1, the operations further comprising:
obtaining second sensor data generated by one or more monitoring system devices, wherein the second sensor data describes second weather conditions on the outside of the property;
determining, based on the first time data and the second sensor data, whether a first connected door of the property is to be opened, wherein the determining comprises:
determining that the first time data satisfies the predetermined time rule for opening the first door; and
determining that the second sensor data does not satisfy the predetermined weather rule for allowing the monitoring asset to exit the property; and,
determining, based on the determination that the predetermined weather rule was not satisfied, that the first door is not to be opened.

7. The property monitoring system of claim 1, the operations further comprising:
obtaining second time data, wherein the second time data describes a second time of day;
determining, based on the second time data and the first sensor data, whether a first connected door of the property is to be opened, wherein the determining comprises:
determining that the second time data does not the satisfy the predetermined time rule for opening the first door; and
determining, based on the determination that the predetermined time rule is not satisfied, that the first door is not to be opened.

8. A method for using a property monitoring system to facilitate exits of a monitored asset from an inside portion of a property, the method comprising:
obtaining first time data, wherein the first time data describes a first time of day;
obtaining first sensor data generated by one or more monitoring system devices, wherein the first sensor data describes first weather conditions on the outside of the property;
determining, based on the first time data and the first sensor data, whether a first connected door of the property is to be opened, wherein the determining comprises:
determining that the first time data satisfies a predetermined time rule for opening the first door; and
determining that the first sensor data satisfies a predetermined weather rule for allowing the monitored asset to exit the property;
based on determining that the first connected door is to be opened and before opening the first door, determining whether a first status of a second connected door of the property is open or closed; and based on a determination that the second connected door of the property is closed:

transmitting an instruction to the first connected door to cause the first connected door to open.

9. The method of claim 8, wherein the monitoring system devices include one or more of a camera, a drone, a climate sensor, a motion sensor, or a transmitter of a tracking device attached to the monitored asset.

10. The method of claim 9, wherein the climate sensor includes one or more of a rain sensor, a humidity sensor, an outdoor temperature sensor, a light sensor, or a wind sensor.

11. The method of claim 8, the method further comprising:

based on a determination that the second connected door of the property is open:

transmitting an instruction to the second connected door to cause the second connected door to close; and after determining that the second connected door has closed, transmitting an instruction to the first connected door to cause the first connected door to open.

12. The method of claim 8, the method further comprising:

obtaining second sensor data generated by one or more monitoring system devices, wherein the second sensor data describes second weather conditions on the outside of the property;

determining, based on the first time data and the second sensor data, whether a first connected door of the property is to be opened, wherein the determining comprises:

determining that the first time data satisfies the predetermined time rule for opening the first door; and determining that the second sensor data does not satisfy the predetermined weather rule for allowing the monitoring asset to exit the property;

and, determining, based on the determination that the predetermined weather rule was not satisfied, that the first door is not to be opened.

13. The method of claim 8, the method further comprising:

obtaining second time data, wherein the second time data describes a second time of day;

determining, based on the second time data and the first sensor data, whether a first connected door of the property is to be opened, wherein the determining comprises:

determining that the second time data does not the satisfy the predetermined time rule for opening the first door; and determining, based on the determination that the predetermined time rule is not satisfied, that the first door is not to be opened.

14. A computer-readable storage device having stored thereon instructions, which, when executed by data processing apparatus, cause the data processing apparatus to perform operations comprising:

obtaining first time data, wherein the first time data describes a first time of day;

obtaining first sensor data generated by one or more monitoring system devices, wherein the first sensor data describes first weather conditions on the outside of the property;

determining, based on the first time data and the first sensor data, whether a first connected door of the property is to be opened, wherein the determining comprising:

determining that the first time data satisfies a predetermined time rule for opening the first door; and determining that the first sensor data satisfies a predetermined weather rule for allowing the monitored asset to exit the property;

based on determining that the first connected door is to be opened and before opening the first door, determining whether a first status of a second connected door of the property is open or closed; and based on a determination that the second connected door of the property is closed:

transmitting an instruction to the first connected door to cause the first connected door to open.

15. The computer-readable storage device of claim 14, wherein the monitoring system devices include one or more of a camera, a drone, a climate sensor, a motion sensor, or a transmitter of a tracking device attached to the monitored asset.

16. The computer-readable storage device of claim 15, wherein the climate sensor includes one or more of a rain sensor, a humidity sensor, an outdoor temperature sensor, a light sensor, or a wind sensor.

17. The computer-readable storage device of claim 14, the operations further comprising:

based on a determination that the second connected door of the property is open:

transmitting an instruction to the second connected door to cause the second connected door to close; and after determining that the second connected door has closed, transmitting an instruction to the first connected door to cause the first connected door to open.

18. The computer-readable storage device of claim 14, the operations further comprising:

obtaining second sensor data generated by one or more monitoring system devices, wherein the second sensor data describes second weather conditions on the outside of the property;

determining, based on the first time data and the second sensor data, whether a first connected door of the property is to be opened, wherein the determining comprises:

determining that the first time data satisfies the predetermined time rule for opening the first door; and determining that the second sensor data does not satisfy the predetermined weather rule for allowing the monitoring asset to exit the property;

and, determining, based on the determination that the predetermined weather rule was not satisfied, that the first door is not to be opened.

19. The computer-readable storage device of claim 14, the operations further comprising:

obtaining second time data, wherein the second time data describes a second time of day;

determining, based on the second time data and the first sensor data, whether a first connected door of the property is to be opened, wherein the determining comprises:

determining that the second time data does not the satisfy the predetermined time rule for opening the first door; and determining, based on the determination that the predetermined time rule is not satisfied, that the first door is not to be opened.

\* \* \* \* \*

UNITED STATES PATENT AND TRADEMARK OFFICE
CERTIFICATE OF CORRECTION

PATENT NO. : 10,782,681 B1  
APPLICATION NO. : 15/796512  
DATED : September 22, 2020  
INVENTOR(S) : Alison Jane Slavin Page 1 of 1

It is certified that error appears in the above-identified patent and that said Letters Patent is hereby corrected as shown below:

In the Claims

In Claim 7, Column 30, Line 42, after "not" delete "the".

In Claim 13, Column 31, Line 52, after "not" delete "the".

In Claim 19, Column 32, Line 65, after "not" delete "the".

Signed and Sealed this  
First Day of December, 2020

Andrei Iancu  
*Director of the United States Patent and Trademark Office*